United States Patent

[11] 3,586,020

[72] Inventor Romald E. Bowles
Silver Spring, Md.
[21] Appl. No. 738,540
[22] Filed June 20, 1968
[45] Patented June 22, 1971
[73] Assignee Bowles Fluidics Corporation
Silver Spring, Md.

[54] ADAPTIVE FLUIDIC FUNCTION GENERATORS
59 Claims, 18 Drawing Figs.

[52] U.S. Cl. .......... 137/81.5
[51] Int. Cl. .......... F15c 1/12
[50] Field of Search .......... 137/81.5;
235/200 PF, 201 PF, 201 FS, 201 ME

[56] References Cited

UNITED STATES PATENTS

| | | | |
|---|---|---|---|
| 3,208,462 | 9/1965 | Fox et al. | 137/81.5 |
| 3,250,469 | 5/1966 | Colston | 137/81.5 X |
| 3,279,488 | 10/1966 | Jones | 137/81.5 |
| 3,285,264 | 11/1966 | Boothe | 137/81.5 |
| 3,302,398 | 2/1967 | Toplin et al. | 137/81.5 X |
| 3,339,571 | 9/1967 | Hatch, Jr. | 235/201 X |
| 3,375,841 | 4/1968 | Schonfeld et al. | 137/81.5 |
| 3,410,312 | 11/1968 | Cogar | 137/81.5 |
| 3,437,100 | 4/1969 | Rona | 137/81.5 |
| 3,107,850 | 10/1963 | Warren et al. | 137/81.5 X |
| 3,238,959 | 3/1966 | Bowles | 137/81.5 |
| 3,327,725 | 6/1967 | Hatch, Jr. | 137/81.5 |
| 3,348,562 | 10/1967 | Ogren | 137/81.5 |

*Primary Examiner*—Samuel Scott
*Attorney*—Rou & Edell

ABSTRACT: Variable function generation techniques are disclosed for fluidic systems. One technique employs a fluidic amplifier which is constructed to provide an output signal as a variable function of an input signal in accordance with selectively variable proportioning of the input signal among the amplifier input ports. Alternatively, the input signal is variably proportioned between plural amplifiers having different gain characteristics, the output signals of each amplifier being combined to provide a common signal. A still further alternative comprises amplification of a differential pressure signal in a proportional three-output passage fluidic amplifier, the three output signals from the amplifier being selectively paired to provide various functions of the input signal, the various functions in turn being selectively gated to provide an output signal comprising various combinations of the functions.

INVENTOR
ROMALD E. BOWLES

BY Hurvitz, Rose & Greene
ATTORNEYS

INVENTOR
ROMALD E. BOWLES

BY Hurvitz, Rose & Greene

ATTORNEYS

INVENTOR
ROMALD E. BOWLES

BY Hurvitz, Rose & Greene
ATTORNEYS

INVENTOR
ROMALD E. BOWLES

BY *Hurvitz, Rose & Greene*

ATTORNEYS

INVENTOR
ROMALD E. BOWLES

BY Hurvitz, Rose & Greene
ATTORNEYS

INVENTOR
ROMALD E. BOWLES

BY Hurwitz, Rose & Greene

ATTORNEYS

INVENTOR
ROMALD E. BOWLES

BY Hurwitz, Rose & Greene
ATTORNEYS

ADAPTIVE FLUIDIC FUNCTION GENERATORS

BACKGROUND OF THE INVENTION

The present invention relates to fluidic function generators and, more particularly, to individual components and/or circuits having the capability of providing an output signal as one of a selected plurality of functions of an input signal.

In my copending U.S. patent application Ser. No. 676,262, filed Oct. 18, 1967 and entitled "Self-Adaptive Systems", I describe a self-adaptive system in which an amplifier gain characteristic is selectively varied in response to variations in a system parameter. The feature of self-adaptability enables the system to: (1) optimize its own performance when operating under anticipated operating conditions; (2) to accommodate changes in operating requirements; and (3) to extend the system operating conditions to provide performance capabilities of a system not originally anticipated. Generally, a control system can be described mathematically by transfer functions which relate the input and output signals. In a conventional system, this transfer function is a compromise selected by the designer and is fixed at the time the system is assembled. The fixed transfer function enables the system to operate adequately within an anticipated range of operating conditions. The conventional system also provides optimized performance for selected points within this range, these points corresponding to the designer's original predictions of the most probable or most frequently encountered operating conditions. In an adaptive control system of the type with which this invention is concerned, these transfer functions can be modified on command while the system is operating.

The present invention is concerned with techniques for modifying gain characteristics of fluidic elements and circuits. In presenting this description, the general approach employed is to describe techniques by which fluidic elements or fluidic circuits can be provided with selectively variable gain characteristics in response to a variable performance command signal. The performance command signal generally represents an evaluation of some parameter or characteristic of a system to be controlled and is generated by any of a number of techniques which, per se, do not constitute part of the present invention. For present purposes, it will be assumed that a command signal is provided as an evaluation of the operation of system performance.

While the primary application of the invention disclosed herein is in self-adaptive systems, it will be apparent to those with ordinary skill in the art that performance command signals need not necessarily originate as system performance measurements but rather may be provided from controls actuable independently of the system in which the amplifier element of the circuit is operating.

It is therefore a broad object of the present invention to provide a fluidic system having an output signal versus input signal characteristic which is selectively variable.

It is another object of the present invention to provide a fluidic amplifier having at least two input passages and at least one output passage, and for which the output signal versus input signal characteristic is variable in response to a predetermined parameter of the input signal.

It is still another object of the present invention to provide a fluidic circuit in which various predetermined output signals versus input signal characteristics are selectively provided.

SUMMARY OF THE INVENTION

In one aspect of the present invention, a fluid input signal is applied to a fluidic amplifier having two or more output passages, the signals at the various output passages being selectively paired to provide a fluid output signal as a function of the fluid input signal. For example, the differential pressure appearing across any pair of output passages in a three-output passage amplifier is a different function of the input signal to the amplifier than that provided by the differential pressure between any other pair of the amplifier output passages. Further, any two output passages may be connected to the input passages of a maximum pressure selector which provides an output signal having a pressure equal to the higher of the two input pressure supplied thereto. The output signal from the maximum pressure selector unit may itself serve as a desired function of the input signal, or it may be applied to a further proportional amplifier along with the signal from one of the output passages from the first-mentioned proportional amplifier, said further amplifier providing an output signal proportional to the difference between the two pressure signals applied thereto. Still another function of the fluid input signal may be obtained by selecting whichever output signal appearing at any pair of the three amplifier output passages is at any time of lower pressure than the other output signals; or by the difference between the lower pressure signal and the pressure appearing at one of the amplifier output passages as the desired functional of the differential pressure input signal. Any of these functions may be provided and selectively gated to a common output device so that one or more of the various functions can be selectively provided either individually or in combination in response to appropriate command gating signals.

In another aspect of the present invention, selective variation of the output signal versus input signal function is achieved by selective proportioning of the input signal to different control ports of a fluidic amplifier configuration, said configuration being such that the output function provided in response to a control signal at one of said control ports is different than the output function provided in response to application of an input signal to the other of said control ports. For example, a three-dimensional reversing chamber element having an axially asymmetrical chamber wall may be provided such that the function relating the angle of deflection of the power stream at the reversing chamber output passages to the amplifier input signal varies in accordance with the plane of deflection in which the power stream is deflected. Thus, by angularly disposing a pair of control nozzles relative to one another in a different plane than that of power stream flow and by proportioning the input signal between said control nozzles as desired, the plane of deflection of the power stream and hence its again function or characteristic may be varied as desired. Similarly, the gain of the axially asymmetric reversing chamber may be varied by introducing a swirl in the power stream, such as by introducing of controlled amounts of command signal fluid about the periphery of the power stream, and thereby varying the plane of deflection of the power stream.

In the case of two-dimensional amplifiers, the input signal may be distributed to appropriate control nozzles which produce different characteristic gains in the amplifier. For example, if two control nozzles are located at different angles relative to the power stream, the resultant control streams will have different effects in deflecting the power stream. Similarily, where one control nozzle is located further upstream than another, application of a control signal thereto has a greater effect in deflecting the power stream than is achieved by application of the same control signal to said other control nozzle.

Similarly, an input signal may be proportioned between two different fluid amplifiers, each having a different gain and having their output passages connected in common. For example, proportioning an input signal between a single stage amplifier and a three-stage amplifier, wherein each stage is substantially identical, permits selection of an overall gain anywhere within the range of gains individually provided by the single stage and three-stage amplifier. In addition, digital type or "on-off" command signals may be utilized by employing fluidic switching devices so that gain characteristics may be varied between discrete states rather than employing continuous gain function variations.

BRIEF DESCRIPTION OF THE DRAWINGS

The above and still further objects, features and advantages of the present invention will become apparent upon consideration of the following detailed description of several embodiments thereof, especially when taken in conjunction with the accompanying drawings, wherein.

DETAILED DESCRIPTION OF THE PREFERRED EMBODIMENTS

Figure 1:
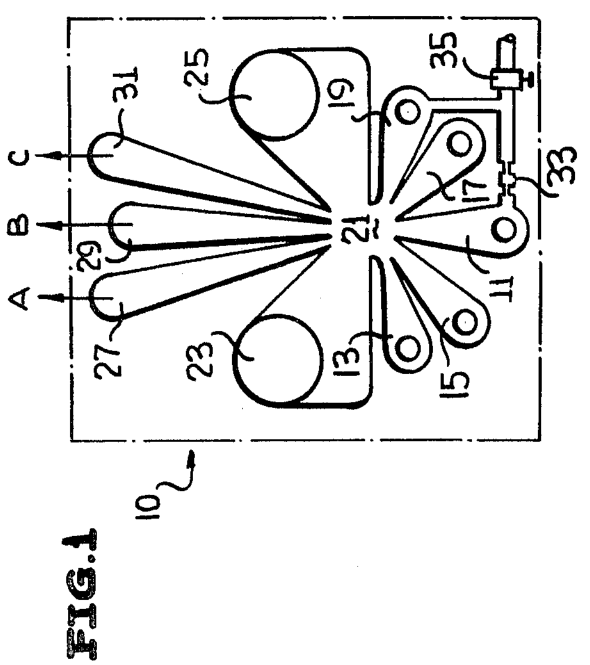
FIG. 1 is a plan view of a conventional proportional fluidic amplifier utilized in the present invention.

Referring now specifically to FIG. 1, there is illustrated a proportional type pure fluid amplifier 10 of a conventional type and which is utilized in the present invention. In order to facilitate an understanding of the particular embodiments illustrated and described hereinbelow, it is first necessary to understand the operation of pure fluid amplifiers such as amplifier 10, which are employed in these embodiments. The following description is of only one such element and a number of the described embodiments employ only that element. This, however, is not to be construed as limiting the scope of this invention to the use of only amplifiers such as amplifier 10 for it will be readily apparent that different types of fluidic amplifiers may be utilized according to the principles of the present invention to obtain various output versus input gain characteristics.

Amplifier 10 is of the stream interaction type, designed to operate in the proportional mode. In this type of amplifier, a power nozzle 11 issues a stream of fluid into an interaction region or chamber 21. A control stream issued from any of the two left control nozzles 13 and 15 or the two right control nozzles 17 and 19 impacts against and deflects the power stream away from said control nozzle. Where contemporaneous streams are issued from more than one of the control nozzles, there is a momentum differential thus created across the power stream to control the power stream deflection. There is a conservation of momentums between the power and control streams and therefore the power stream is deflected at the point of impact from its original direction of flow through an angle which is a function of the momentum of the power stream and the net momentum of the control streams. In this manner, a low energy control stream of fluid may be utilized to direct a high energy power stream of fluid toward or away from a target area or receiving aperture; this phenomenon constitutes amplification.

The interaction chamber 21 of amplifier 10 extends laterally into left- and right-vented recesses 23 and 25, respectively, to minimize boundary layer effects and insure analog or proportional operation of amplifier 10. Central output passage 29 opens into interaction chamber 21 coaxially with respect to power nozzle 11. Left and right output passages 27 and 31, respectively, open into interaction chamber 21 along axes which are respectively radially displaced to the left and right of the axis of power nozzle 11. Connected between power nozzle 11 and control nozzle 19 is a restrictor 33 which also communicates with adjustable valve 35 at the end of the restrictor remote from power nozzle 11. It will be apparent from the subsequent description that restrictor 33 and its connection between the two nozzles 11 and 19 need not be employed for every utilization of amplifier 10; however, for present purposes, restrictor 33 serves the purpose of dropping the pressure between that applied to power nozzle 11 and control nozzle 19 whereby to issue a bias control stream from control nozzle 19 at an adjustably lower pressure than the power stream pressure. In the alternative, additional restrictors of various pressure dropping capability may be employed between the power nozzle 11 and any one or more of the control nozzles 13, 15, 17 and 19.

In describing one possible mode of operation of amplifier 10, it will be assumed that a first source of pressurized fluid (not illustrated) is coupled to power nozzle 11. In addition to creating a power stream in chamber 21, the pressurized fluid creates a bias flow of lower pressure than the power stream at control nozzle 19 via pressure dropping restrictor 33, the amount of flow to nozzle 19 being adjustable via valve 35. Alternatively, an adjustable external bias signal may be coupled to nozzle 19 if desired, thereby eliminating the necessity for restrictor 33 and valve 35. It is assumed for purposes of the following discussion, that control nozzles 15 and 17 are vented to a suitable fluid dump, that a variable pressure input signal is applied to control nozzle 13 and that three output signals denominated A, B and C, respectively, issue from output passages 27 and 29 and 31 as a function of the position of the power stream. It is known that the power stream of fluid from nozzle 11, when arriving at the ingress orifices of output passages 27, 29 and 31, has an axially directed dynamic pressure which varies in amplitude as one considers various portions transversely of the stream's longitudinal axis. The center of the stream is at a maximum dynamic pressure, while the boundary regions of the stream, due to momentum interchange with the ambient fluid in interaction chamber 21, are at a lesser pressure. The widths of the ingress orifices of passages 27, 29 and 31 are illustrated as being such that each output passage samples a small transverse portion of the power stream.

If the power stream is axially centered on the orifice of passage 27, maximum pressure is developed at that passage. This is illustrated most clearly in FIG. 1*a*wherein curve B represents the pressure for signal B appearing at output passage 29 as a function of the angular deflection of the power stream produced by an input pressure differential appearing across the left and the right control nozzles, respectively. Similarly, curve A represents the output pressure for signal A at output passage 27 as a function of the input pressure differential and curve C represents the output pressure for signal C appearing at output passage 31 in response to the input pressure differential. For zero pressure differential appearing between left control nozzle 13 and right control nozzle 19 (remembering, of course, that control nozzles 15 and 17 are vented for purposes of the present discussion) signal B is at a maximum pressure whereas signals A and C are at somewhat lower and substantially equal pressures. Of course, signals A and C would not be equal if passages 27 and 31 were located asymmetrically relative to passage 29.

If the pressure applied to control nozzle 19 exceeds the pressure applied to the control nozzle 13 by an amount sufficient to axially center the power stream on the ingress orifice of output passage 27, maximum pressure is developed for signal A in this passage. This condition is represented for an input pressure corresponding to $\Delta P_1$ in FIG. 1*a*. It will be noted that, for input conditions corresponding to $\Delta P_1$, signal B is at a somewhat lower pressure than signal A and signal C is at an even lower, almost negligible pressure. If, on the other hand, the pressure appearing at control nozzle 13 is sufficiently greater than the pressure appearing at the control nozzle 19 to deflect the power stream so that it is axially centered on the ingress orifice of output passage 31 (as would be the case for an input pressure differential of $\Delta P_2$ in FIG. 1*a*), then signal C is a maximum pressure for this passage, signal B is at a somewhat lower pressure, and signal A is at a still lower and almost negligible pressure.

Figure 1A:
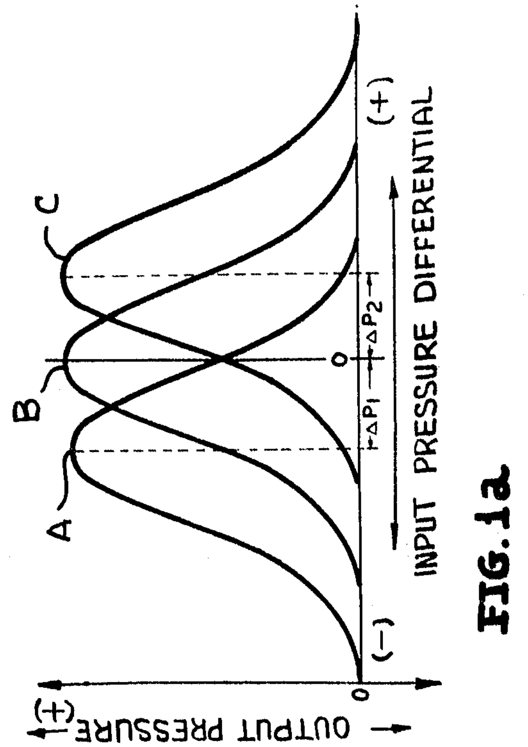
FIG. 1*a*is a plot of the output pressure versus input pressure characteristics for the amplifier of FIG. 1.

It is seen that signals A, B and C represented in FIG. 1*a* are nonlinear in the region of their maximum and minimum pressures. This is due to the fact that the velocity profile of the power stream at the output passage to power nozzle distances employed herein is a bell-shaped curve, symmetrical about the longitudinal axis of the stream. The reason for this may be best understood by considering the velocity profile (velocity as a function of distance transversely from the power stream axis) of the power stream. Upon reaching the input orifices of the output passages, the fluid at the boundaries of the power stream is flowing at a velocity which is only slightly greater than that of the ambient fluid. The fluid at the center of the stream on the other hand is flowing at a somewhat greater velocity, representing the maximum velocity of the stream. The slope of the cure between the maximum and minimum velocities is not a straight line but rather more like a bell-shaped curve which rises gradually at first, thereafter rising rapidly in a linear manner toward the center region of the stream at which point the curve levels off at maximum pressure. The curve is symmetrical about the longitudinal axis of the power stream and therefore presents a bell-shaped image. Since, as mentioned above, the relatively narrow orifices of the output passages sample small portions of the power stream which change as the stream is deflected, these orifices receive fluid at velocities which vary in accordance with stream deflection. Since the output passages receive fluid from a portion of the stream which changes as the input signal varies, and since these portions have different velocities which are defined by the bell-shaped velocity profile of the stream, the output signal pressure must be a function of both the velocity profile curve and the stream and the input signal pressure. Thus, the curve A of FIG. 1*a* is a plot of the pressure resulting from the velocity profile of the stream as received by output passage 27, and likewise curves B and C are plots of the pressure resulting from the stream velocity profile as received by output passages 29 and 31, respectively.

Figure 2:
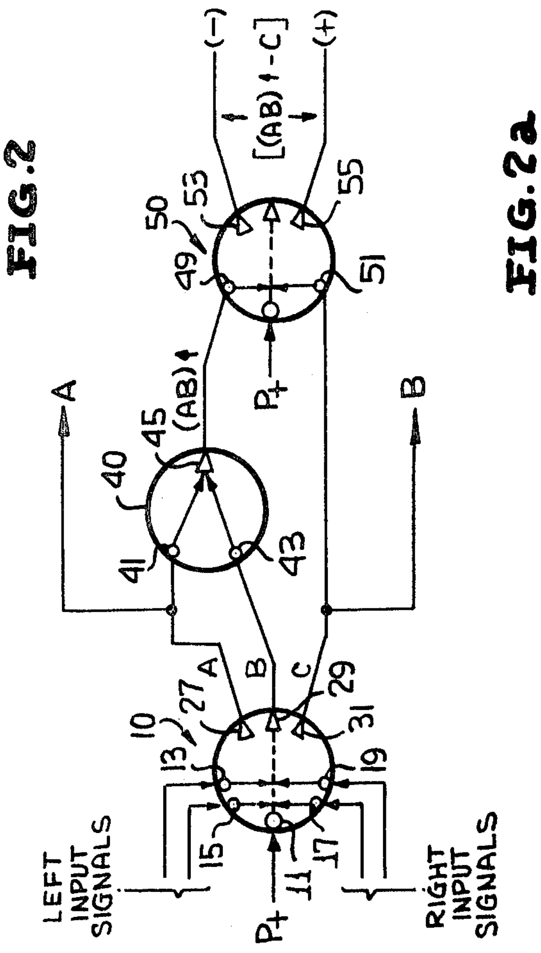
FIGS. 2, 3 and 3*b*are schematic illustrations of circuits utilizing the amplifier of FIG. 1 to provide various output pressure versus input pressure characteristics in accordance with the principles of the present invention.

Referring now to FIG. 2 of the accompanying drawings, there is illustrated in a schematic form a circuit employing amplifier 10 of FIG. 1 for the purpose of generating a plurality of different output versus input functions. Output passages 27 and 29, carrying signals A and b respectively, are connected to respective input nozzles 41 and 43 of a maximum pressure selector unit 40. Maximum pressure selector unit 40 is a type illustrated and described in my copending U.S. Pat. application Ser. No. 386,492, filed July 31, 1964, U.S. Pat. No. 3,411,520 and titled "Maximum Pressure Selector." The maximum pressure selector 40 provides an output signal at output passage 45 which is always equal to the higher of the two pressures applied at input nozzles 41 and 43. Thus, the signal at output passage 45 is either A or B, whichever is greater. For purposes of simplifying the following description, this signal will be given the shorthand notation (AB)↑. Similarly, where a signal representing either signal A or B, whichever is smaller, is referred to hereinbelow, the shorthand notation (AB)↓ will be utilized. Signal (AB)↑ appearing at output passage 45 is applied to a left control nozzle 49 of a proportional fluidic amplifier 50. Fluidic amplifier 50 may be of the same type as amplifier 10 described hereinabove in which only one each of the left and right control nozzles are utilized. Signal C appearing at output passage 31 of amplifier 10 is applied to right control nozzle 51 of amplifier 50. The signal appearing across right output passage 55 and left output passage 53 of amplifier 50 will thus be a measure of the pressure differential between the signals appearing at output passage 45 of maximum pressure selector 40 and output passage 31 of amplifier 10. The shorthand notation for such a signal is (AB)↑—C. The purpose of amplifier 50 is merely to provide a proper pressure level for the output signal in question, amplification being necessary to compensate for any pressure losses incurred by signals A, B and C in the various elements 10, 40 and 50 and the interconnections thereto.

Figure 2A:
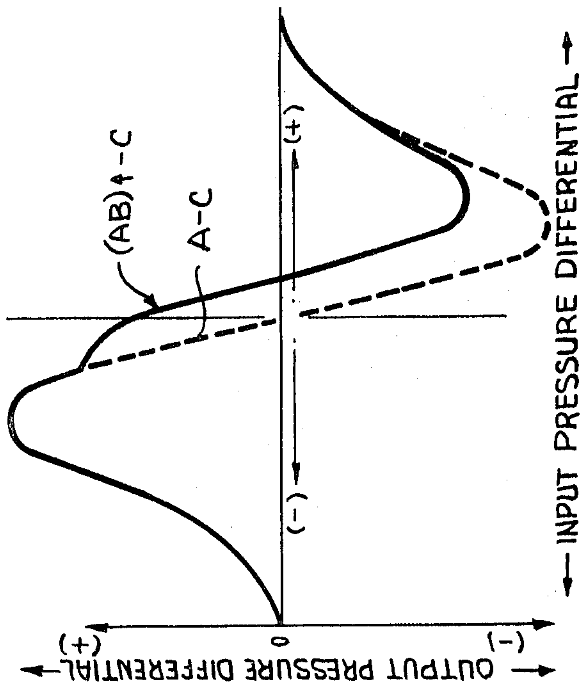
FIGS. 2*a* and 3*a*are plots of various output pressure versus input pressure characteristics provided by the circuits of FIGS. 2 and 3, respectively.
Figure 4A:
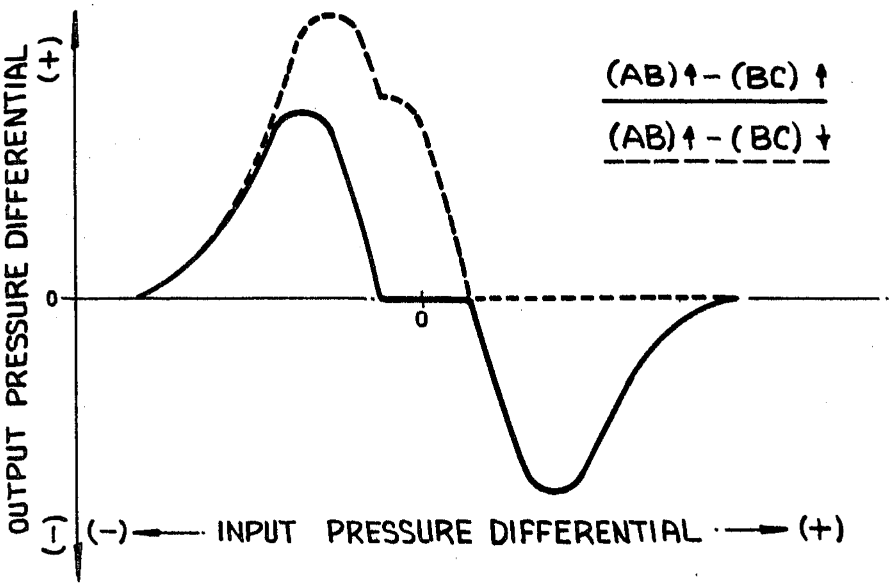
FIG. 4*a*is a plot of two combined output pressures versus input pressures which are selectively obtainable with the circuit of FIG. 4.
Figure 4:
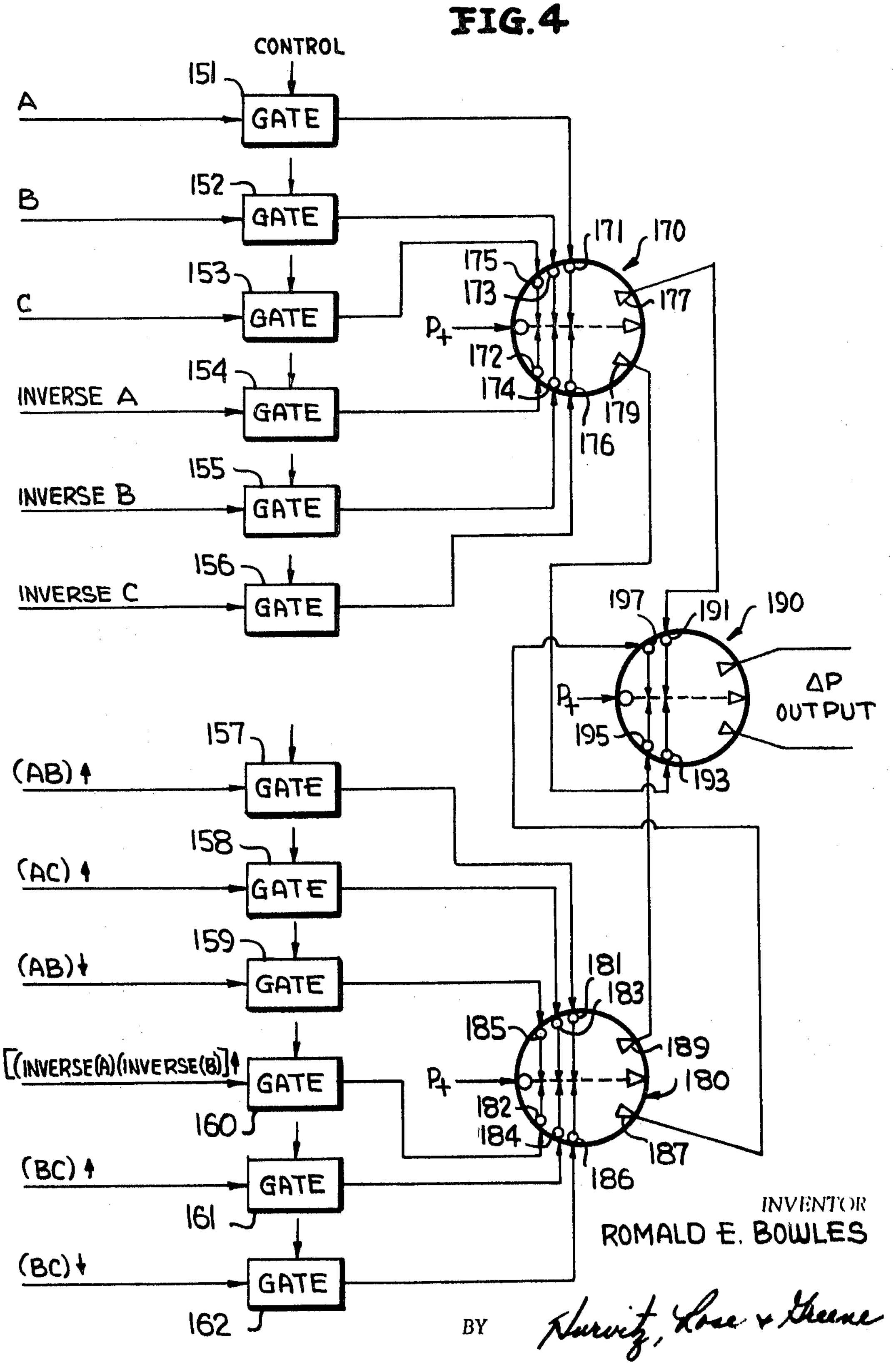
FIG. 4 is a schematic illustration of a switching circuit utilized for selectively gating and combining the various functions generated in the circuits of FIGS. 2, 3 and 3*b*.

In FIG. 2*a*, the solid line represents a plot of the pressure of signal (AB)↑—C versus the input pressure differential appearing across the left and right control nozzles of amplifier 10. The dotted line in FIG. 2*a* represents the signal A—C which is simply the differential pressure appearing across output passages 27 and 31 of amplifier 10. These curves are derived by simple point by point subtraction of curves in FIG. 1*a*. The curves for signals (AB)↑—C and A—C coincide for all input pressure differentials producing a greater pressure in output passage 27 (signal A) of amplifier 10 than in output passage 29 (signal B). Signal (AB)↑—C does not coincide with signal A—C for values of signal B which are greater than signal A. One may provide an output signal which can be selectively switched between A—C and (AB)↑—C and thereby selectively choose the gain characteristic for the circuit of FIG. 2 as desired. A circuit for accomplishing this selective switching is illustrated in FIG. 4 and will be described in detail below.

It will be evident from the description of the circuit of FIG. 2 that various other gain characteristics may be selectively provided in conjunction with amplifier 10 by utilizing techniques similar to those described in relation to FIG. 2. For example, the signal (BC)↑—A may be provided by applying signals B and C to respective input nozzles of a maximum pressure selector and then applying the maximum pressure selector output signal and signal A to opposite control nozzles of a proportional pure fluid amplifier. Similarily, signals (AB)↑—B, (AC)↑—C, (BC)↑—B, etc. may be provided and selectively chosen by themselves or in combination to represent the overall gain characteristic for a particularly circuit.

Figure 3:
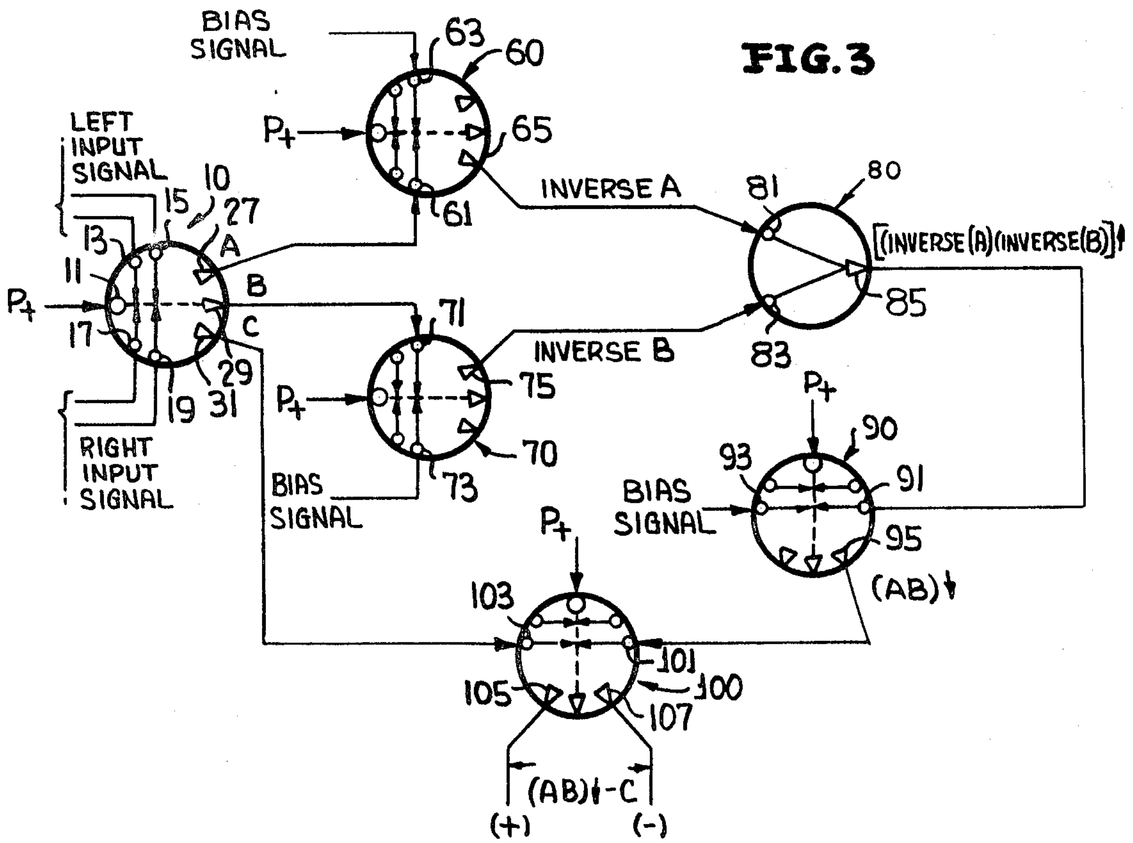

Referring now to FIG. 3, there is illustrated in schematic form a circuit for providing still further output versus input functions. Output passage 27 of amplifier 10, which may be the same unit employed in FIG. 2, is connected in FIG. 3 to right control nozzle 61 of a proportional amplifier 60. Amplifier 60 has the same general configuration as amplifier 10. A constant bias signal from a separate source of pressurized fluid (not illustrated), or from the P+ source applied to the power nozzle of amplifier 60 utilizing restrictor 33 and valve 35 of FIG. 1, is applied to left control nozzle 63 of amplifier 60. The pressure of the bias signal is such that the power stream in amplifier 60, in the absence of pressurized fluid at right control nozzle 61, is directed toward right output passage 65 and centrally aligned therewith. Therefore, for zero input signal pressure at control nozzle 61, maximum output signal pressure appears at output passage 65; and as the pressure at control nozzle 61 increases, the pressure and output passage 65 decreases accordingly until the power stream is deflected sufficiently far from right output passage 65 that the pressure at the latter is substantially zero. It may be seen therefore that the pressure signal appearing at output passage 65 of amplifier 60 may be termed "INVERSE A" since the pressure appearing thereat varies inversely with signal A appearing at output passage 27 of amplifier 10.

Output passage 29 of amplifier 10, for purposes of the circuit illustrated in FIG. 3, is connected to left control nozzle 71 of proportional fluidic amplifier 70, the latter having the same general configuration as amplifiers 60 and 10 described above. Right control nozzle 73 of amplifier 70 receives a bias at a sufficient pressure to deflect the power stream of amplifier 70 toward and in axial alignment with left output passage 75 in the absence of pressurized fluid at control nozzle 71. In a manner analogous to that described above for the generation of signal "INVERSE A" at amplifier 60, amplifier 70 provides the signal "INVERSE B" at output passage 75. The signals "INVERSE A" and "INVERSE B" are applied to respective input nozzles 81 and 83 of a maximum pressure selector unit 80, the latter being substantially the same as maximum pressure selector unit 40 described in reference to FIG. 2. The signal appearing at output passage 85 of maximum pressure selector 80 is [(INVERSE A) (INVERSE B)]↑ or, in verbal terms, either of the inverse of A or the inverse of B whichever is greater. This signal in turn is applied to the left control nozzle 91 of a further proportional fluidic amplifier 90 of the same general configuration as amplifier 10. A bias signal is connected to right control nozzle 93 of amplifier 90 and adjusted to have a pressure such that in the absence of pressurized fluid at left control nozzle 91, the power stream of amplifier 90 is centrally aligned with left output passage 95. It will be appreciated that the left output passage 95 of amplifier 90 provides the inverse of the signal applied to left control nozzle 91 in a manner similar to the provision of signals "INVERSE A" at amplifier 60 and "INVERSE B" at amplifier 70. The signal at output passage 95 therefore is the inverse of signal [(INVERSE A) (INVERSE B)]↑ which, in fact, is equivalent to signal (AB)↓ (or in verbal terms, either of signal A or signal B whichever is of lower pressure.

As described above in relation to the various functions generated in the circuit of FIG. 2, signal (AB)↓ may itself be utilized as an output versus input characteristic for a particular circuit or may be referenced to any of individual signals A, B or C to provide a differential characteristic for a given circuit. For example, and as illustrated in FIG. 3, signal (AB)↓ from output passage 95 of amplifier 90 may be applied to left control nozzle 101 of amplifier 100. Amplifier 100 has the same general configuration as amplifier 10 as described hereinabove. Signal C from output passage 31 of amplifier 10 is connected to right control nozzle 103 of amplifier 100 whereby the differential output pressure appearing across output passages 105 and 107 represents the signal (AB)↓—C. Of course, in order to restore the signals to their proper levels, the various signal levels may be adjusted as desired by appropriate pressure dropping restrictors, pressure regulators for the P+ sources, and other known expedients. Similarly, where increased levels are required, amplification may be employed for this purpose.

Figure 3A:
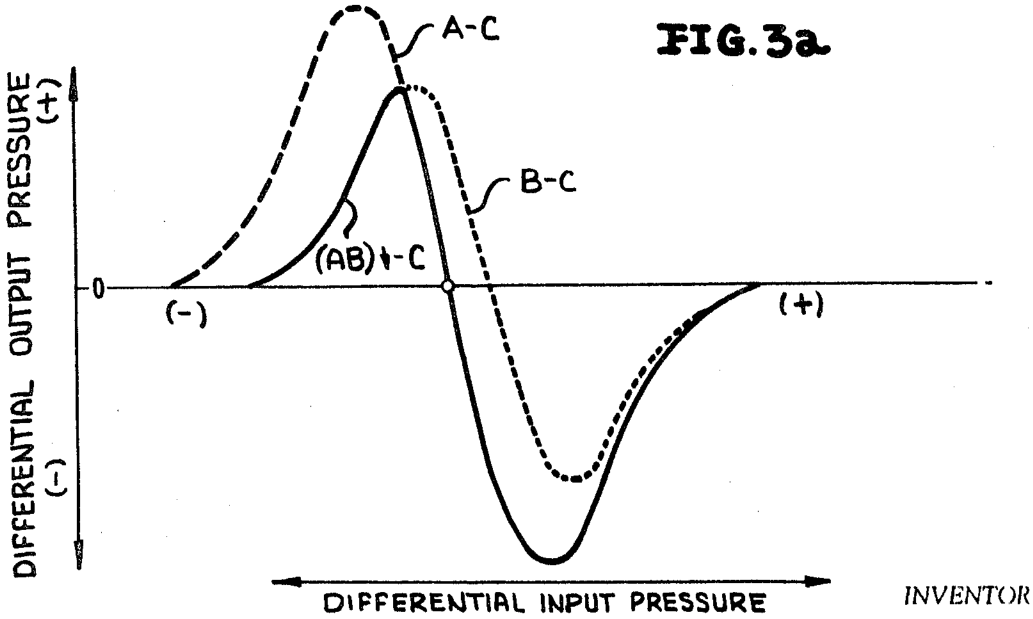

As an illustration of the variable characteristics to be achieved by utilization of the circuit of FIG. 3, reference is made to FIG. 3*a* in which the dotted line represents the signal B—C, the dashed line represents the signal A—C, and the solid line represents the signal (AB)↓—C. These curves are obtained by simply subtracting the curves in FIG. 1*a* on a point by point basis. It is to be noted that signals B—C and (AB)↓—C coincide whenever signal B is less than signal A, and that signals A—C and (AB)↓—C coincide whenever signal A is less than signal B. One may selectively choose between one or more of these functions to provide an overall output characteristic for the circuit of FIG. 3. A technique for doing this is best illustrated in FIG. 4 to be described below.

The techniques utilized in FIG. 3 may be utilized for any combination of signals A, B and C to provide a particular desired output versus input characteristic for the circuit. For example, the signals (AC)↓—B, (AB)↓—B, (BC)↓—B, etc. may be generated, as may be the signals (AC)↓, (BC)↓, INVERSE A, INVERSE B, and INVERSE C.

In providing a signal corresponding to (AB)↓ as appears at output passage 95 in amplifier 90 of FIG. 3, a different technique may be utilized such as that described in copending U.S. application Ser. No. 720,274 filed on Apr. 10, 1968, by Ira C. Edell, entitled "Fluidic Signal Selector."

Figure 3B:
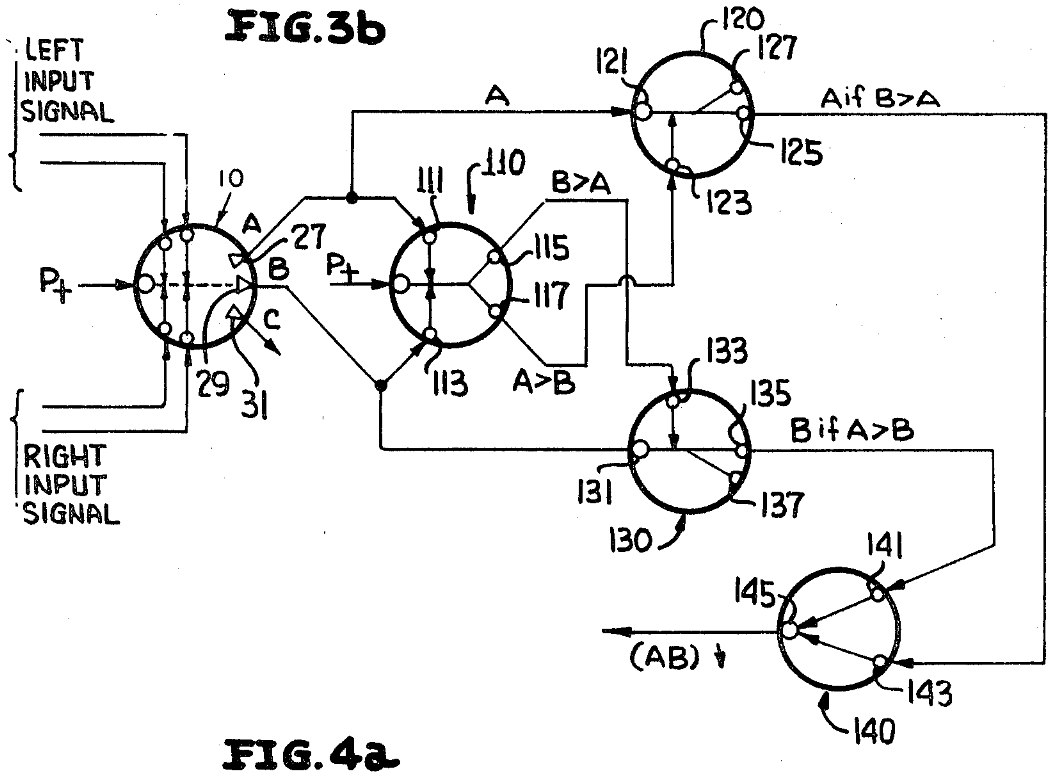

This technique is best illustrated on FIG. 3*b* wherein as between signals A and B the lower pressure signal is selected. Specifically, signal A appearing at output passage 27 of amplifier 10 is applied to the left control nozzle 111 of bistable fluidic element 110, and also to the power nozzle 121 of monostable fluidic element 120. Bistable fluidic element 110 may be of the general type considered in U.S. Pat. No. 3,225,780, and functions to provide an output signal at left output passage 115 whenever the pressure at the right control nozzle 113 exceeds the pressure at the left control nozzle 111, and provides an output signal at right output passage 117 whenever the pressure of the left control nozzle 111 exceeds the pressure at right control nozzle 113. When the pressure at left and right control nozzles 111 and 113 are equal, the output signal will appear at the output passage from which it was last provided. Monostable fluidic element 120 may be of the general configuration as the device disclosed in U.S. Pat. No. 3,240,219 and operates to provide an output passage 125 at the same signal applied to power nozzle 121 in the absence of a control signal at control nozzle 123. Upon application of a control signal to control nozzle 123, the signal appearing at power nozzle 121 is provided instead at output passage 127.

Signal B appearing at output passage 29 of amplifier 10 is applied to the right control nozzle 113 of bistable fluidic element 110 and to the power nozzle 131 of a monostable fluidic element 130. Monostable fluidic element 130 is of substantially the same type as monostable fluidic element 120, so that in the absence of a control signal applied at control nozzle 133, the signal appearing at power nozzle 131 is provided at output passage 135. Similarly, in the presence of a control signal at control nozzle 133, the signal applied at power nozzle 131 is provided at output passage 137.

The signal appearing at left output passage 115 of bistable fluidic element 110 may be termed (B>A) and is applied to control nozzle 133 of monostable fluidic element 130. The signal appearing at right output passage 117 of bistable fluidic element 110 may be termed (A>B) and is applied to control nozzle 123 of monostable fluidic element 120. It may be seen therefore that whenever signal A exceeds signal B, the control signal applied to control nozzle 123 deflects signal A to output passage 127 of element 120 whereas signal B remains undeflected and appears at output passage 135 of element 130. Similarily, when signal B is greater than A, signal A is provided at output passage 125 of element 120 and signal B is deflected to output passage 137 of element 130. Output passages 125 and 135 of respective elements 120 and 130 are connected to respective input passages 143 and 141 of a maximum pressure selector unit 140 of the same general type as maximum pressure selector unit 40 in FIG. 2. The signal appearing at output passage 145 of maximum pressure selector 140 represents the larger of two pressure signals appearing at output passages 125 and 135 of monostable units 120 and 130. Thus, the signal appearing at output passage 145 may be termed (AB)↓. This signal may be utilized independently as discussed above in regard to the same signal generated in FIG. 3, or may be utilized in conjunction with any of the other signals described with reference to FIGS. 2 and 3.

Referring now to FIG. 4, there is illustrated in schematic form a circuit wherein all of the functions described in relation to FIGS. 2, 3 and 3*b* above may be selectively gated to provide individual or combined output functions for an overall fluidic circuit. By way of example as to the various functions that may be selectively gated, twelve fluidic transmission gates 151—162 are illustrated in FIG. 4 for the purpose of selectively gating twelve respective signals. The transmission gates 151 through 162 inclusive may be of the same general configuration as the monostable fluidic elements 120 and 130 illustrated in FIG. 3*b*. Each of the gates may be operated either to transmit its input signal therethrough only in the presence of a control signal or to transmit its signal therethrough only in the absence of a control signal depending upon which output passages are utilized. For the purposes of FIG. 4, the former mode has arbitrarily been chosen so that only in the presence of a control signal at a respective one of the gates is the input signal applied to that gate transmitted therethrough. Signals A, B and C are applied as input signals to gates 151, 152 and 153, respectively. The output signals from each of these gates are applied to three respective left control nozzles 171, 173, 175 of a proportional fluidic amplifier 170 having the same general configuration as amplifier 10 of FIG. 1 except for the provision of three pair of control nozzles rather than the two pair of control nozzles provided in the FIG. 1. The signals (INVERSE A), (INVERSE B), and (INVERSE C) are applied to respective gates 154, 155, 156 as input signals and the output signals from these gates are applied to respective right control nozzles 172, 174 and 176 of fluidic amplifier 170. The input signals to transmission gates 157, 158 and 159 are signals (AB)↑, (AC)↑, and (AB)↓. The output signals from gates 157, 158 and 159 are applied respectively to left control nozzles 181, 183 and 185 of proportional fluidic amplifier 180, the latter having the same general configuration as amplifier 170 described above. Transmission gate 160, 161 and 162 receive respective input signals [(INVERSE A) (INVERSE B)]↑, (BC),↑ , and (BC)↓. The output signals from gates 160, 161 and 162 are applied to respective right control nozzles 182, 184 and 186 of proportional amplifier 180.

Left and right output passages 177 and 179, respectively, of amplifier 170 are connected to respective left and right control nozzles 191 and 193 of the proportional pure fluidic amplifier 190. Amplifier 190 is of the same general configuration as amplifier 10 described above in relation to FIG. 1. Left and right output passages 189 and 187 respectively of amplifier 180 are connected to respective right and left control nozzles 195 and 197 of fluidic amplifier 190.

Of course, the remaining function signals described in relation to FIGS. 2, 3 and 3*b* above may be employed in circuits with gates similar to those illustrated in FIG. 4; however, for the purpose of brevity only twelve of the signals are shown to be selectively gated herein. It is also to be understood that the particular interconnections of the gates and the amplifiers 170, 180 and 190 are strictly arbitrary and that any combination of interconnections may be employed in accordance with the selective functions desired, including combinations wherein individual ones of the gated signals are applied to control nozzles of more than one amplifier.

In operation of the circuit illustrated in FIG. 4, whenever it is desired to utilize one of the input signals as part of or as the entire gain characteristic for a particular circuit, the gate associated with that input signal is activated by a control signal to permit transmission of that signal through its respective gate. For example, if it is desired to provide an output function corresponding to signal (AB)↑–(BC)↑, the control signal for gate 157 and the control signal for gate 161 are activated so that respective signals (AB)↑ and (BC)↑ are transmitted to respective control nozzles 181 and 184 of amplifier 180. The differential pressure between the two signals is amplified in both amplifiers 180 and 190 to provide an output function having the desired characteristic. This characteristic is illustrated in FIG. 4*a* by the solid line. It is noted that this characteristic has a dead band region corresponding to those portions of the characteristic in which signal B is simultaneously greater than both signal A and signal C.

A a further example, suppose it is desired to obtain an output function corresponding to (AB)↑–(BC)↓. Under such circumstances, the control signals for gates 157 and 162 would simultaneously be activated and the differential pressure appearing between the two signals would be amplified by amplifiers 180 and 190 in turn. The resulting output pressure versus input pressure characteristic appears in FIG. 4*a* as the dotted line. It is to be noted that this characteristic provides a zero output pressure whenever signal B is greater than signal A and less than C.

In a similar manner, any combination of the various function signals may be employed to produce in selective fashion any desired output versus input characteristic for an overall fluidic circuit.

With regard to the circuits illustrated in FIGS. 2, 3, 3*b* and 4, it is to be understood that utilization of the specific amplifier 10 of FIG. 1 is intended to be only exemplary and that various other amplifier configurations may be employed. More particularly, proportional amplifiers having any number of output passages may be employed so as to provide signals in addition to A, B, C of FIG. 1*a*. These additional signals may be processed through circuits similar to those illustrated in FIGS. 2, 3, 3*b* and 4 so as to yield an even greater number of output versus input function signals.

It is also to be understood that signals A, B and C illustrated in FIG. 1*a* need not be related to one another in the precise manner illustrated in FIG. 1*a* . For example, if output passages 27, 29 and 31 are spaced closer to or further away from one another, the curves A, B and C of FIG. 1*a* experience a similar displacement relative to one another. In providing signals such as A–C, (AB)↑, or any other function signals discussed above changes in relative position between signals A, B and C in FIG. 1*a* changes the function signals accordingly. Thus, different configurations of amplifier 10 may be employed to achieve different overall gain function.

Figures 5, 6, 7, 8:
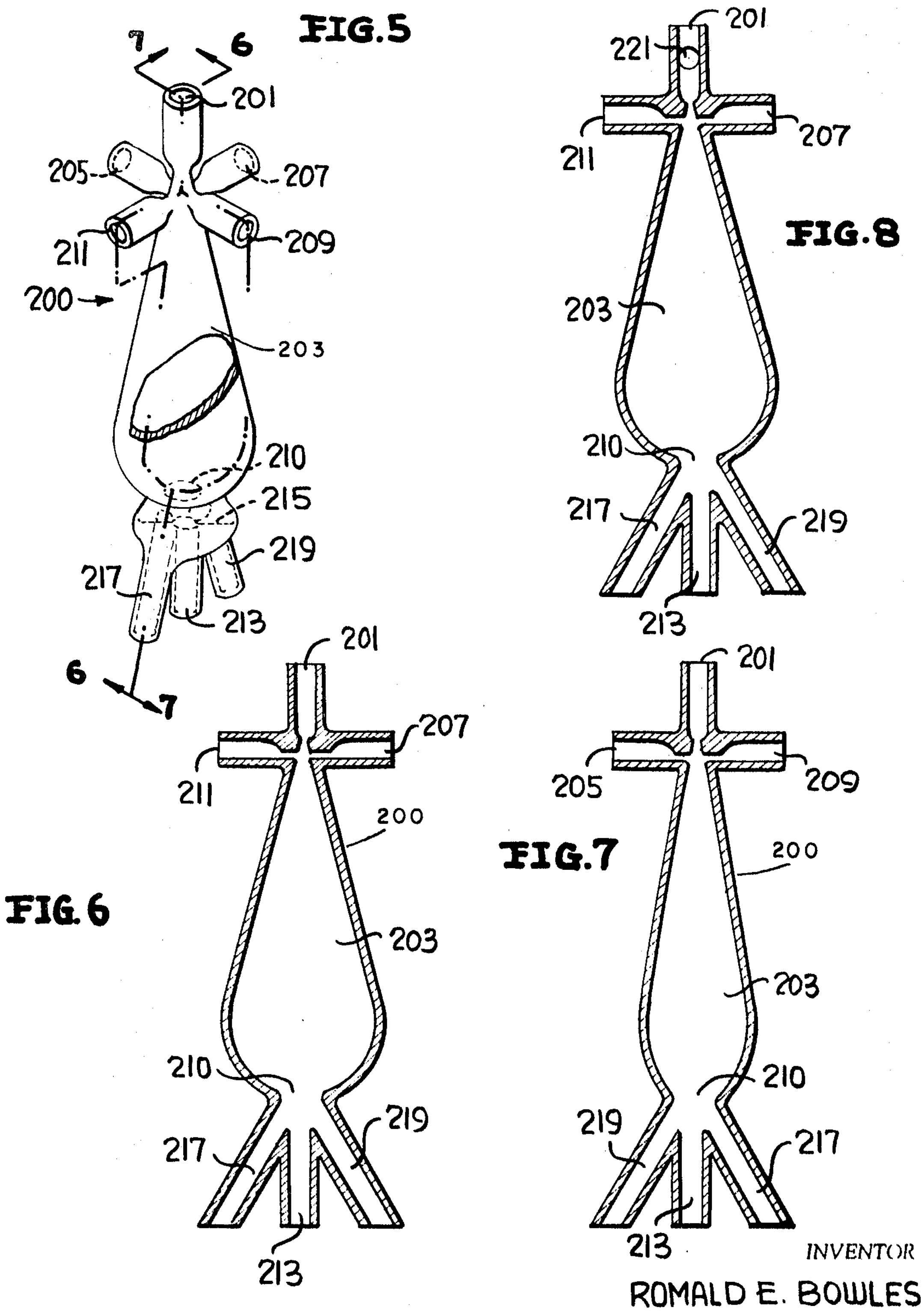
FIG. 5 is a view in perspective of a three-dimensional axially asymmetric reversing chamber type fluidic amplifier constructed in accordance with the principles of the present invention.
FIGS. 6 and 7 are sectional views taken through the lines 6–6 and 7–7 respectively in FIG. 5.
FIG. 8 is a sectional view similar to that illustrated in FIG. 6 illustrating means for introducing power stream swirl in the reversing chamber amplifier of FIG. 5.

Referring now to FIG. 5 of the accompanying drawings, there is illustrated in perspective a three-dimensional proportional fluidic amplifier 200 of the boundary layer type. Amplifier 200 is supplied with pressurized fluid at power nozzle 201 from which a power stream is issued into the narrow end of a generally tear-shaped divergent-convergent chamber 203. Chamber 203 is asymmetrical with respect to its longitudinal axis, that is, the cross-sectional configuration of the chamber when viewed in any plane perpendicular to its longitudinal axis, takes the shape of an ellipse. Four control nozzles 205, 207, 209 and 211 communicate with the upstream end of chamber 203 and are adapted to issue control streams of fluid in interacting relationship with the power stream issued from nozzle 201. In the particular embodiment of the invention illustrated in FIG. 5, nozzles 207 and 211 are aligned on opposite sides of the power stream and have their centerlines disposed in the plane defined by the major axes of the elliptical cross sections of chamber 203. Control nozzles 205 and 209 are also oppositely aligned on opposite sides of the power stream, and have their centerlines disposed coplanar with and perpendicular to the centerlines of control nozzles 207 and 211. Thus, control nozzles 205 and 209 have their centerlines lying in the plane defined by the minor axes of the elliptical cross sections of chamber 203.

As the power stream exits from nozzle 201, its direction is controlled generally by pressure changes in the boundary layer regions according to the relative energy and flow rate of the control streams that issue from nozzles 205, 207, 209 and 211 as in conventional pure fluid amplifiers of the boundary layer type. Once directional control has been imparted to the power stream by means of the control nozzles, the power stream is reversed or reoriented relative to the longitudinal axis of chamber 203 in accordance with the operational theory described in my copending U.S. patent application Ser. No. 435,167 filed Feb. 25, 1965 and entitled "Fluid Operated Valve." The redirected fluid stream converges toward the longitudinal axis of chamber 203 at the throat 210 terminating chamber 203 at its downstream end. Throat 210 is axially aligned with nozzle 201 and disposed such that the converging redirected stream always crosses centrally of throat 210. The walls of the amplifier 200 flare outwardly (or diverge) downstream of throat 210. Fluid flow from throat 210 is selectively received by a pair of concentric receiving apertures axially aligned with power nozzle 201 and the throat 210. The inner receiving aperture comprises a generally cylindrical output passage 213 having a somewhat smaller opening than that of throat 210. The outer of the two concentric receiving apertures is split by a flow divider 215 and terminates in two independent output passages 217 and 219, respectively. Flow divider 215 is disposed such that power stream fluid, deflected by control streams from either of control nozzles 209 or 211, is directed toward and received by output passage 217 and such that power stream fluid, deflected by control streams issuing from either of control nozzles 205 and 207, is directed toward and received by output passage 219. More specifically, the apex of flow divider 215 is parallel to the plane defined by the centerlines of control nozzles 205, 207, 209 and 211, and is disposed at an angle of 45° relative to the centerlines of each of the control nozzles.

Power stream flow out of throat 210 can be controlled as infinitely variable directional attitudes by virtue of appropriate control streams issuing from the various control nozzles 205, 207, 209 and 211. For example, a maximum input pressure signal at control nozzle 207 deflects the power stream to the left as viewed in FIG. 6, the power stream following the contour of the wall of chamber 203 which redirects the stream back to the right (again, as viewed in FIG. 6), out through throat 210 and into output passage 219. Similarly, a maximum input signal at control nozzle 205 directs the power stream issuing from the power nozzle 201 toward the right as viewed in FIG. 7 (the "right" in FIG. 7 being displaced 90° relative to the "left" in FIG. 6), the power stream following the contour of the wall which redirects the stream back to the left (again, as viewed in FIG. 7) and out through output passage 219. It is to be noted, however, that the angle at which the power stream approaches output passage 219 when deflected by a maximum signal from control nozzle 205 differs somewhat from the angle at which the deflected power stream approaches output passage 219 when deflected by a maximum signal from control nozzle 207. This difference in angle is due to the axial asymmetry of chamber 203. Specifically, the chamber wall is more concave in the plane viewed in FIG. 6 than it is in the plane viewed in FIG. 7, and therefore the degree of redirection of a deflected power stream by the chamber wall in these planes differs correspondingly. Thus, a full control signal applied to control nozzles 207 results in deflection of substantially all of the power stream toward passage 219; whereas, a control signal of a similar pressure applied to control nozzle 205 results in only a portion of the power stream being directed to the output passage 219, the remainder being directed to output passage 213. If a fluid signal is proportioned between control nozzles 207 and 211, the power stream is directed toward a portion of the chamber sidewall exhibiting a degree of concavity which is intermediate the concavities illustrated in FIGS. 6 and 7, and therefore the degree of deflection of the power stream relative to output passage 219 for an input fluid signal of a given pressure level can be varied by appropriate proportioning of the input signal between control nozzles 207 and 205.

Figure 9:
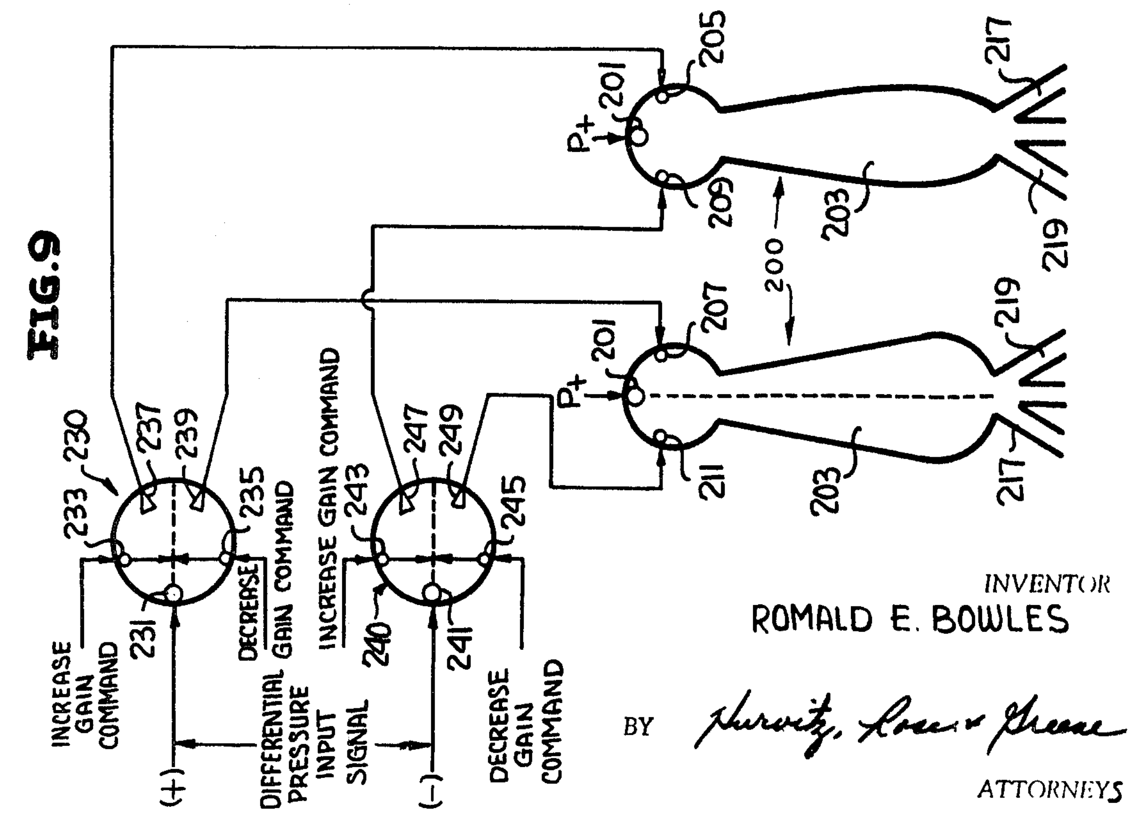
FIG. 9 is a schematic illustration of a circuit for distributing an input signal to various control ports of the amplifier of FIG. 5 for the purpose of providing selectively variable gain therefrom.

An undeflected power stream, that is, a power stream which is not affected by control signals from any other control nozzles 205, 207, 209 and 211, is directed axially of chamber 203 and issues through central output passage 213. In deflecting the power stream with one or more of the control signals, an inherent passive amplification characteristic of the converging-diverging chamber 203 is being utilized. Specifically, the chamber wall redirects or redeflects the power stream in accordance with the angle at which it is received after being actively amplified by control stream deflection. Thus, for example, if a control signal is applied only to control nozzle 207, varying proportions of the power stream will be received at output passage 219 as a function of the strength of the control signal applied to control nozzle 207. If it is desired to vary the output pressure in passage 219 produced by a given control signal pressure, it is merely necessary to proportion the input signal as desired between control nozzles 207 and 205. A scheme for providing such proportioning of the input signal is illustrated in FIG. 9 which is described in greater detail below.

It will be apparent that the relationship existing between output passage 219 and control nozzles 205 and 207 exists also for output passage 217 and control nozzles 209 and 211 insofar as provision of a variable gain characteristic is concerned. More specifically, if an input signal is proportioned between control nozzles 209 and 211, the output pressure at passage 217 versus the input signal pressure characteristic is correspondingly varied.

As explained in greater detail in my above-referenced copending U.S. patent application Ser. No. 435,167, the crossover of the power stream relative to the longitudinal axis of the chamber 203 centrally of throat 210 serves to decouple amplifier 200 from varying load conditions. More specifically, the power stream, when crossing over through throat 210, fills the throat with high-energy fluid thereby effectively sealing chamber 203 from conditions downstream of throat 210. Such conditions might otherwise modify desired operational characteristics of amplifier 200 by varying the pressure internally of chamber 203.

In addition to providing variable gain characteristics in amplifier 200 by proportioning the input signal between various control nozzles, it is also possible to provide variable gain by controllably introducing a swirling motion of the power stream. A technique for providing controlled swirl is illustrated in FIG. 8 of the accompanying drawings which is a view of amplifier 200 in section similar to the view illustrated in FIG. 6. The embodiment of FIG. 8 differs from that of FIG. 6, however, in that a port 221 is defined through the wall of power nozzle 201 and adapted to issue a relatively low velocity stream of fluid about the periphery of the fluid in nozzle 201. Depending upon the strength of the stream issued from port 221 a corresponding amount of swirl is introduced in the power stream. In the presence of swirl, the power stream, when deflected, "walks" about the axis of amplifier 200 changing the portion of the chamber wall to which it would normally be directed by the control streams. Peripheral movement of the power stream about the chamber wall, as described above, produces corresponding gain variation for the amplifier 200.

Referring now to FIG. 9, there is illustrated in schematic form a circuit by which an input pressure signal may be selectively distributed to appropriate control nozzles of amplifier 200 of FIG. 5. For purposes of FIG. 9, a single differential pressure input signal is employed, one line of which is selectively distributed between control nozzles 205 and 207, and the other of which is selectively distributed between control nozzles 209 and 211 of amplifier 200. It is to be understood, however, that this particular configuration need not be construed as limiting the scope of the invention because the input signal distributed between control nozzles 205 and 207 does not necessarily have to be differentially varying with respect to the signal distributed between control nozzles 209 and 211.

The differential pressure input signal in FIG. 9 is applied across power nozzles 231 and 241 of respective proportional pure fluid amplifiers 230 and 240. Amplifiers 230 and 240 may be of substantially the same type as amplifier 10 of FIG. 1. An "increase gain command" fluid signal is applied to left control nozzle 233 of amplifier 230 and to left control nozzle 243 of amplifier 240. A "decrease gain command" signal is applied to right control nozzle 235 of amplifier 230 and right control nozzle 245 of amplifier 240. "The increase gain command" and "decrease gain command" signals are provided selectively from some remote means which does not form a part of the present invention. The "increase gain command" signal applied to amplifier 230 need not be the same signal applied to amplifier 240 although for purposes of the description of FIG. 9 it is assumed that both increase gain command signals are the same. A similar relationship applies between the two "decrease gain command" signals applied to respective control nozzles 235 and 245 of amplifiers 230 and 240. The left output passage 237 of amplifier 230 is connected to control nozzle 205 of amplifier 200; likewise, the right output passage 239 of amplifier 230 is connected to control nozzle 207 of amplifier 200. The left output passage 247 of amplifier 240 is connected to control nozzle 209 of amplifier 200; likewise, the right output passage 249 of amplifier 240 is connected to control nozzle 211 of amplifier 200.

In operation, assume that by virtue of the presence of a "-decrease gain command" signal at respective control nozzles 235 and 245 of amplifiers 230 and 240, the power streams of said amplifiers are centered at output passages 237 and 247, respectively. Consequently, the entire differential pressure input signal appears across control nozzles 205 and 209 of amplifier 200 which therefore operates at minimum gain. Variations in the differential pressure input signal produce corresponding variations in the differential output pressure appearing across output passages 217 and 219; however, the output pressure differentials vary in accordance with a relatively low gain with respect to the input pressure differential. If it is assumed now that the "increase gain command" and "-decrease gain command" signals are of equal strength whereby the power streams of amplifiers 230 and 240 distribute substantially equally between respective output passage pairs 237, 239 and 247 and 249, it is seen that the gain of amplifier 200 is increased. Specifically, equal portions of the differential pressure input signal are applied across high gain control nozzles 207 and 211 and low gain control nozzles 205 and 209 in amplifier 200. The differential output pressure appearing across output passages 217 and 219 therefore reflects a somewhat greater gain than under the previously assumed conditions wherein the "decrease gain command" signal was dominant. If now the "increase gain command" signal completely dominates the decrease gain command signal at amplifiers 230 and 240 so that the power streams of said amplifiers are directed entirely to respective output passages 239 and 249, the entire differential pressure input signal is applied across the high gain control nozzles 207 and 211 of amplifier 200. Consequently, the output pressure differential appearing across passages 217 and 218 reflects a greater gain with respect to the input pressure differential than was present under the sets of conditions previously assumed.

It is apparent from the above description that by appropriately applying the "increase gain" and "decrease gain" command signals for the desired distribution of the differential pressure input signal, any desired gain within the operating range of amplifier 200 may be achieved.

It should be stressed that the "increase gain command" and the "decrease gain command" signals employed in FIG. 9 may be either differentially or independently varied to provide a desired gain characteristic for amplifier 200.

Figure 10:
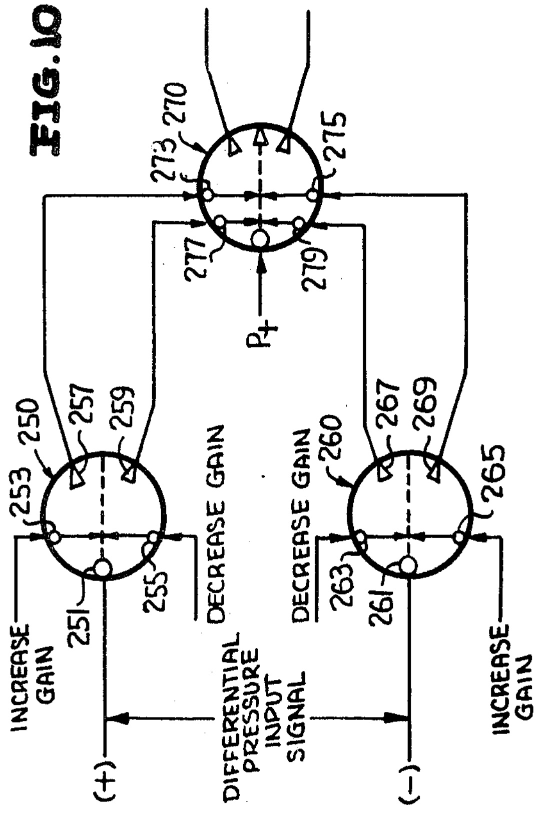
FIG. 10 is a schematic illustration of a circuit for selectively varying the gain characteristic of an amplifier having control nozzles disposed at different distances downstream of the power nozzle.

Referring now to FIG. 10, there is illustrated in schematic form a circuit employing a two-dimensional fluidic amplifier configuration for producing gain variations similar to those produced in amplifier 200 in the circuit of FIG. 9. More specifically, a differential pressure input signal is applied across power nozzles 250 and 260. Amplifiers 250 and 260 are substantially identical to amplifiers 230 and 240 employed in the embodiment illustrated in FIG. 9. An "increase gain command" signal is applied to left control nozzle 253 of amplifier 250 and right control nozzle 265 of amplifier 260; a "decrease gain command" signal is applied to right control nozzle 255 of amplifier 250 and left control nozzle 263 of amplifier 260. Left output passage 257 of amplifier 250 is connected to a left control nozzle 273 of proportional amplifier 270. Amplifier 270 is substantially similar to amplifier 10 illustrated in FIG. 1 except that one pair of left and right control nozzles 273 and 275, respectively, are disposed a substantial distance downstream of the second pair of left and right control nozzles 277 and 279, respectively. It is well known, as described in detail in U.S. Pat. No. 3,331,379, that power stream deflection produced by a control stream issuing from a nozzle such as control nozzle 273 disposed substantially downstream of another nozzle such as control nozzle 277 is significantly less than power stream deflection produced by a control stream of equal strength issued from upstream control nozzle 277. Consequently, control nozzle pair 273, 275 may be considered low gain input nozzles and control nozzles 277 and 279 may be considered high gain input nozzles.

Output passage 259 of amplifier 250 is connected to control nozzle 277 of amplifier 270. Left output passage 267 of amplifier 260 is connected to high gain right control nozzle 279 of amplifier 270. Right output passage 269 of amplifier 260 is connected to low gain right control nozzle 275 of amplifier 270.

In a manner similar to the operation described relative to the circuit of FIG. 9, the gain of amplifier 270 may be selectively varied by appropriately varying the "increase gain" and "decrease gain" command signals applied to amplifiers 250 and 260 so as to distribute the differential pressure input signal accordingly between the high and low gain control nozzles of amplifier 270.

Figure 10A:
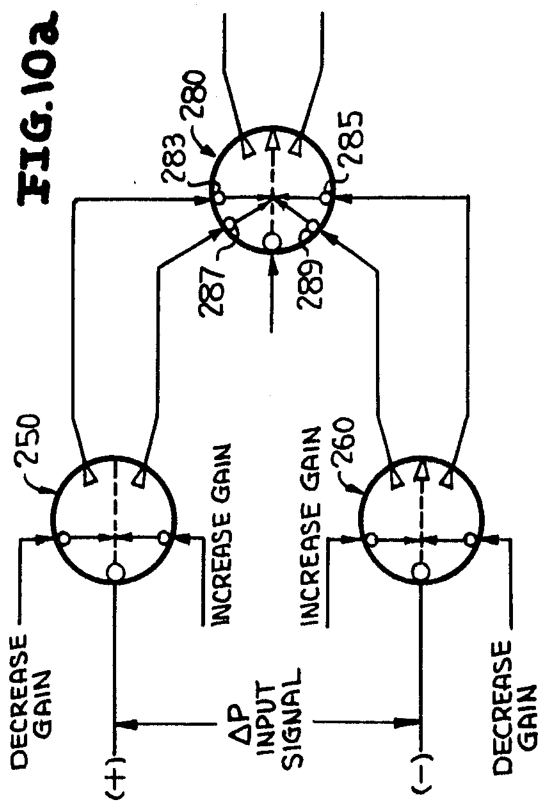
FIG. 10*a*is a schematic representation of a circuit for providing selectively variable gain from a proportional fluidic amplifier having control nozzles disposed at different angular relationships with the power stream of the amplifier.

FIG. 10*a* illustrates a modification of the variable gain amplifier circuit illustrated in FIG. 10 wherein proportional amplifiers 250 and 260 are utilized to selectively distribute a differential pressure input signal between high and low gain control nozzles of a proportional amplifier 280. Amplifier 280 is similar to amplifier 10 of FIG. 1 except that one pair of control nozzles, namely, left control nozzle 283 and right control nozzle 285, are disposed at different angles relative to the power stream than are a second pair of control nozzles, namely, left control nozzles 287 and right control nozzle 289. As fully described in U.S. Pat. No. 3,331,379, a control stream of constant strength has different effects upon deflection of the power stream at its angle of intersection with the power stream is varied. Thus, a control stream directed perpendicularly toward the power stream will produce a greater power stream deflection than a control stream of the same pressure directed at some different angle toward the power stream. Control nozzles 283 and 285 are directed so as to issue control streams generally perpendicular to the power stream whereas control nozzles 287 and 289 are disposed so as to issue control streams at some acute angle relative to the power stream. By utilizing amplifiers 250 and 260 to selectively distribute the differential input signal between the high gain control nozzles 283, 285 and the low gain control nozzles 287, 289, the gain of the circuit of FIG. 10*a* may be selectively varied accordingly.

Figure 11:
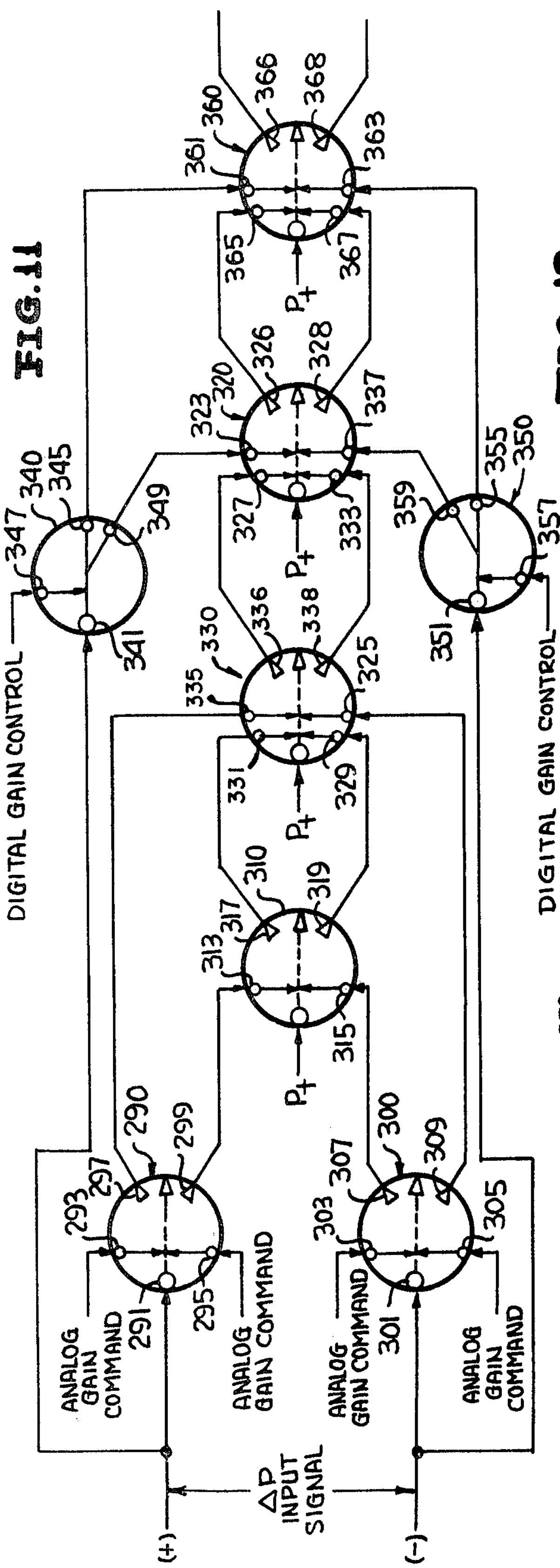
FIG. 11 is a schematic illustration of a circuit employing both analog and digital type command signals for selectively varying the gain of the amplifier circuit.

Referring now to FIG. 11, there is illustrated a fluidic circuit in schematic form wherein digital and analog gain command signals are utilized. A differential pressure input signal is applied across power nozzles 291 and 301 of respective proportional fluidic amplifiers 290 and 300. Amplifiers 290 and 300 are substantially similar to amplifiers 250 and 260 of FIG. 10. Analog gain command signals are applied to respective left and right control nozzles 293 and 295 of amplifier 290 and left and right control nozzles 293 and 295 of amplifier 290 and left and right control nozzles 303 and 305 of amplifier 300. These analog gain command signals may be differentially related so that, for example, the same differential gain command signal appears across the left and right control nozzles of each of amplifiers 290 and 300. On the other hand, if desired, each of the analog gain command signals may be independently variable. Left output passage 297 of amplifier 290 is connected to a left control nozzle 323 of proportional fluidic amplifier 320. Fluidic amplifier 320 may, for example, be substantially identical to amplifier 10 illustrated in FIG. 1. Right output passage 299 of amplifier 290 is connected to left control nozzle 313 of a further fluidic amplifier 310 which for example may also be substantially identical to amplifier 10 of FIG. 1. Left output passage 307 of amplifier 300 is connected to right control nozzle 315 of amplifier 310; whereas right output passage 309 of amplifier 300 is connected to a right control nozzle 325 of amplifier 320. Left output passage 317 of amplifier 310 is connected to a left control nozzle 327 of amplifier 320; right output passage 319 is connected to right control nozzle 329 of amplifier 320.

Left output passage 326 of amplifier 320 is connected to a left control nozzle 331 of fluidic amplifier 330, which for example may be identical to amplifier 10 of FIG. 1. Right output passage 328 of amplifier 320 is connected to a right control nozzle 333 of amplifier 330.

In addition to being connected across power nozzles 291 and 301 of respective amplifiers 290 and 300, the differential pressure input signal is also connected across the power nozzles 341 and 351 of fluidic switching elements 340 and 350, respectively. Switching elements 340 and 350, by way of example, may be identical to elements 120 and 130 illustrated in FIG. 3*b* and described hereinabove. A signal applied to power nozzle 341 of switching element 340 is transmitted directly to output passage 345 thereof unless a control signal appears at control nozzle 347 in which case the signal is deflected at output passage 349. Similarly, an input signal applied to power nozzle 351 of element 350 is normally transmitted to output passage 355 thereof unless a control signal appears at control nozzle 357 in which case the signal flow at power nozzle 351 is deflected to output passage 359. Digital gain control signals are applied to control nozzles 347 and 357 of switching elements 340 and 350, respectively, and both digital control signals may be either simultaneously or independently actuatable in accordance with intended system usage.

Output passage 349 of element 340 is connected to a left control nozzle 355 of amplifier 330 and output passage 359 of switching element 350 is connected to right control nozzle 337 of amplifier 330. Output passage 345 of switching element 340 is connected to a left control nozzle 361 of a proportional fluidic amplifier 360 which, for example, may be identical to amplifier 10 illustrated in FIG. 1. Output passage 355 of the switching element 350 is connected to right control nozzle 363 of amplifier 360. Left output passage 336 and right output passage 338 of amplifier 330 are connected to respective left control nozzle 365 and right control nozzle 367 of amplifier 360.

In operation of the circuit of FIG. 11, amplifier stages 310, 320, 330 and 360 may be considered respective first through fourth stages of a four-stage proportional amplifier. Proportional amplifiers 290 and 300 perform the function of distributing the differential pressure input signal between first and second stages 310 and 320 in response to variations in the analog gain command signal. Fluidic switching elements 340 and 350 serve to adjust the circuit gain by selectively applying a portion of the differential pressure input signal to either the third amplifier stage 330 or the fourth amplifier stage 360. The particular gain characteristic produced in response to a given distribution of the differential pressure input signal by amplifiers 290 and 300 and by elements 340 and 350 depends to a large extent on the pressure level of the P+ source applied to power nozzle of each of amplifier stages 310, 320, 330 and 360. The pressure levels of these three sources may be the same, or may be individually adjusted to provide a tailor made overall gain characteristic of the circuit of FIG. 11. Moreover, the effect of signal distribution among the various amplifier stages may be entirely changed by simply changing the P+ pressure level applied to that stage. For example, let it first be assumed that the P+ pressure levels are increased with ascending order of stages so that the smallest pressure is applied to the power nozzle of amplifier 310 and the highest pressure is applied to the power nozzle of amplifier 360. Similarily, assume that the differential pressure input signal is a somewhat lower pressure level than the P+ pressure applied to amplifier 310. Under these conditions, a portion of the input signal applied to power nozzle 291 of amplifier 290 is connected by output passage 299 into control nozzle 313 of amplifier 310 where it is amplified and provided at output passage 319. This amplified version of the input signal is applied to a right control nozzle 329 of amplifier 320. Similarily, the remaining portion of the input signal applied to power nozzle 291 of amplifier 290 is connected via output passage 297 to a left control nozzle 323 of amplifier 320. It is noted that both portions of the input signal are thus connected in opposition, that is, to opposing control nozzles in amplifier 320. If, for the moment, we consider the gain characteristic at output passages 326 and 328 of amplifier 320, it is seen that for equal distribution of the input signal between output passages 297 and 299 of proportioning amplifier 290, the power stream of amplifier 320 is deflected somewhat toward output passage 326. This is due to the fact that the portion of the input signal appearing at output passage 299 of amplifier 290 is amplified in amplifier 310 and therefore the pressure applied to right control nozzle 329 will be greater than the unamplified pressure applied to left control nozzle 323.

If we assume that the pressure applied to power nozzle 291 of amplifier 290 remains the same but that the analog gain command signals applied across control nozzles 293 and 295 are changed so that the entire input signal is deflected toward output passages 299, a maximum gain condition, an even greater deflection of the power stream of amplifier 320 toward left output passage 326 is produced. This occurs because even though the input signal to amplifier 290 remained at the same pressure, more of it (in this case all of it) is directed to output passage 299, and therefore more of it is amplified by amplifier 310. Therefore, the signal applied to control nozzle 329 exceeds the signal at nozzle 327 by an even greater amount than previously.

If we now assume that the pressure applied to power nozzle 291 remains the same but that the analog gain command signals applied to control nozzles 293 and 295 of amplifier 290 are such that the entire input signal is directed toward output passage 297, a minimum gain condition, a net deflection toward output passage 328 of amplifier 320 is produced. The reason for this, of course, is that none of the input pressure signal is applied to amplifier 310 and all of it is applied to left control nozzle 323 of amplifier 320. In view of the three previously described examples, it should be clear that a large variation in gain characteristic is achievable at the output of amplifier 320, the range of gain being adjustable from positive to negative.

Distribution of the signal applied to power nozzle 301 of amplifier 300 is analogous to that described above for the distribution of the input signal applied to power nozzle 291 of amplifier 290. If, as illustrated in FIG. 11, the two input signals comprise a differentially varying pressure input signal, it is often convenient, though not necessary, to provide differentially varying gain command signals such that the gain command signal applied to control nozzle 293 of amplifier 290 and to control nozzle 305 of amplifier 300 are the same signal, the latter varying differentially with a common analog gain command signal applied to both control nozzle 295 of amplifier 290 and control nozzle 303 of amplifier 300.

In the circuit illustrated in FIG. 11, a technique for switching the circuit gain between two discrete levels is illustrated in conjunction with switching elements 340 and 350. For example, assume a given differential pressure input signal level is provided which in turn produces a predetermined differential output pressure at output passages 326 and 328 of amplifier 320, the latter signal in turn being amplified by cascaded amplifier stages 330 nd 360. In the absence of the digital gain control signal from both of control nozzle 347 of switching element 340 and control nozzle 357 of switching element 350, no gain adjustment is provided at amplifier 330. However, a portion of the differential input pressure is applied via output passages 345 and 355 of elements 340 and 350 respectively across control nozzles 361 and 363 of amplifier 360. As a result, an additional command signal is applied to amplifier 360 having a sense such that an increase of signal 291—341 increases output 368 and decreases output 366. The resulting effect on the overall circuit differential pressure output signal appearing across left and right output passages 366 and 368 of amplifier 360 is to reduce the gain as a function of the input pressure signal. The gain is reduced because the differential pressure applied across control nozzles 361 and 363 is acting in opposition (that is, is varying in an opposite sense) to the amplified version of the differential input signal being applied across left and right control nozzles 365 and 367 of amplifier 360.

Assume now that both control nozzles 347 and 357 of switching elements 340 and 350 respectively receive digital gain control signals whereby the portion of the differential pressure input signal received by the switching elements is applied across left and right control nozzles 335 and 337 of amplifier 330. The positive control signal applied to amplifier 330 is increased whereas the negative control signal applied to amplifier 360 is decreased. Of course, amplifier 360, in receiving the output signal from amplifier 330, will further amplify the positive control signal applied at control nozzle 335 and the system will exhibit and increased gain; however, the individual gain characteristics of amplifiers 330 and 360 are not affected in this mode of operation. The system gain variation produced by the digital gain control signals applied to elements 340 and 350 results in an overall gain increase for the differential pressure output signal appearing across the output passages 366 and 368 of amplifier 360. This is true because a differential pressure provided across control nozzles 335 and 337 varies in the same sense as does the differential pressure appearing across the control nozzles 331 and 333, which in turn vary in the same sense as does the differential pressure input signal applied across the power nozzles 291 and 301 of amplifiers 290 and 300. More specifically, when the system is operating in the maximum gain mode, an increase of pressure at control nozzle 291 produces an increase in pressure at output passage 326 of amplifier 320 thereby increasing the pressure to left control nozzle 331 of amplifier 300. The same increase in pressure at power nozzle 291 is also received at left control nozzle 335 of amplifier 330 via the switching element 340. Since both of the left control nozzles 331 and 335 of amplifier 330, (and in similar fashion both of the right control nozzles 333 and 337) vary in the same sense as input pressure signal variations, an overall increase in gain is experienced by the output signal appearing across output passages 336 and 368 of amplifier 360.

Figure 12:
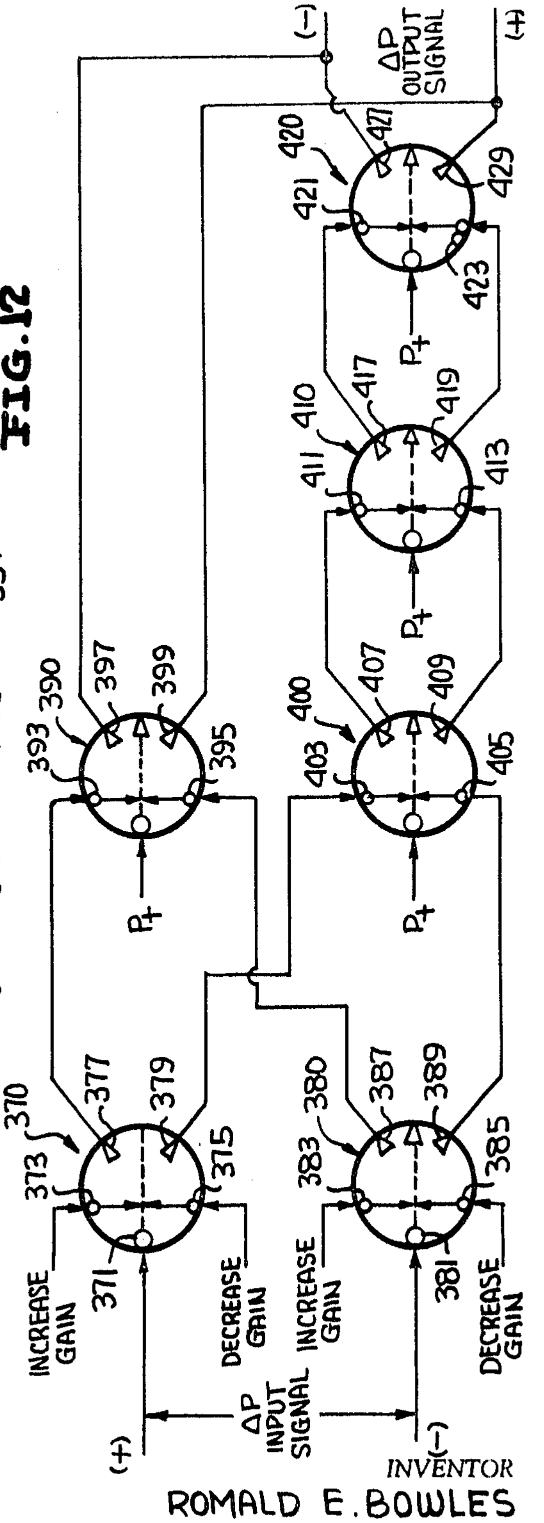
FIG. 12 is a schematic illustration of a circuit for distributing a fluid input signal between fluidic amplifiers having two different gains.

Referring now specifically to FIG. 12, there is illustrated in schematic form a circuit in which a fluid input signal may be distributed proportionally between fluidic amplifiers being connected, to provide a common output signal. A differential pressure input signal is applied across power nozzles 371 and 381 of respective proportional fluidic amplifiers 370 and 380. Amplifiers 370 and 380 may be, for example, substantially the same as amplifiers 290 and 300 illustrated in FIG. 11. An "increase gain command" signal is applied to left control nozzle 373 of amplifier 370 and left control nozzle of 383 of amplifier 380. A "decrease gain command" signal is applied to right control nozzle 375 of amplifier 370 at right control nozzle 385 of amplifier 380. The left output passage 377 of amplifier 370 is connected to left control nozzle 393 of proportional fluidic amplifier 390 which may be of the same general type illustrated in FIG. 1 as amplifier 10. Left output passage 387 of fluidic amplifier 380 is connected to the right control nozzle 395 of amplifier 390. The right output passage 379 of amplifier 370 is connected to the left control nozzle 403 of fluidic amplifier 400, the latter being substantially identical to amplifier 390. Right output passage 389 of amplifier 380 is connected to right control nozzle 405 of amplifier 400. Left and right output passages 407 and 409, respectively of amplifier 400 are connected to respective left and right control nozzles 411 and 413 of a proportional fluidic amplifier 410, and left and right output passages 417 and 419 respectively of amplifier 410 are connected to respective left and right control nozzles 421 and 423 of proportional fluidic amplifier 420. Amplifiers 410 and 420 are substantially identical to amplifier 400. The left output passages 397 of amplifier 390 and 427 of amplifier 420 are connected together as are the right output passages 399 of amplifier 390 and 429 of amplifier 420.

Amplifier stages 400, 410 and 420 comprise a three-stage cascade amplifier; amplifier 390 comprises a single-stage amplifier; and the output passages of the single-stage amplifier and the three-stage amplifiers are connected together to provide a common output signal. If we assume each of amplifiers 390, 400, 410 and 420 to have equal gains, it is readily apparent that the overall gain of the three-stage amplifier is substantially greater than that of single-stage amplifier; in fact, the gain of the three-stage amplifier is approximately equal to the gain of the single stage amplifier raised by a power of three. Amplifiers 370 and 380 respond to the increase and decrease gain command signals applied thereto to proportion the differential pressure input signal as desired between the single and three-stage gain amplifiers so that any desired gain may be selectively achieved within the range defined by the individual gains of the single and three-stage amplifiers.

While I have described and illustrated several embodiments of my invention, it will be clear that variations of the details of construction which are specifically illustrated and described may be resorted to without departing from the true spirit and scope of the invention as defined in the appended claims.

I claim:

1. A fluidic circuit for providing a fluid output signal as a selectively variable function of a fluid input signal, said circuit comprising:

function generating means responsive to said input signal for generating a plurality of function signals, each function signal representing a different function of said input signal; and switching means for producing said fluid output signal, said switching means comprising a plurality of fluidic transmission gates connected to receive respective function signals and operable in response to predetermined commands for selectively providing different combinations of said fluid function signals as said fluid output signal.

2. The fluidic circuit according to claim 1 wherein said function generating means comprises:

proportional fluidic amplifier means including:

means for providing a power stream fluid, at least first and second outlet passages for selectively receiving said power stream and providing respective first and second fluid pressures in response to received portions of said power stream and input means responsive to said input signal for selectively deflecting said power stream relative to said outlet passages;

fluidic comparator means connected to receive said first and second fluid pressures for providing a first fluid control signal in response to said first fluid pressure exceeding said second fluid pressure and a second fluid control signal in response to said second fluid pressure exceeding said first fluid pressure;

first fluidic gating means connected to receive said first fluid pressure and said first fluid control signal for providing said first fluid pressure as a first gated fluid signal only in the absence of said first fluid control signal;

second fluidic gating means connected to receive said second fluid pressure and said second fluid control signal for providing said second fluid pressure as a second gated fluid signal only in the absence of said second fluid control signal; and output means connected to receive said first and second gated fluid signals for providing one of said function signals in accordance with whichever of said first and second gated fluid signals has a higher pressure.

3. The fluidic circuit according to claim 1 wherein said function generating means comprises:

analog fluidic amplifier means including: means for providing a power stream fluid, at least first and second outlet passages for selectively receiving said power stream and providing respective first and second fluid pressures in response to received portions of said power stream and input means responsive to said input signal for selectively deflecting said power stream relative to said outlet passages;

fluidic comparator means connected to receive said first and second fluid pressures for providing a first fluid control signal in response to said first fluid pressure exceeding said second fluid pressure and a second fluid control signal in response to said second fluid pressure exceeding said first fluid pressure;

first fluidic gating means connected to receive said first fluid pressure and said first fluid control signal for providing said first fluid pressure as a first gated fluid signal only in the absence of said first fluid control signal;

second fluidic gating means connected to receive said second fluid pressure and said second fluid control signal for providing said second fluid pressure as a second gated fluid signal only in the absence of said second fluid control signal; and output means connected to receive said first and second gated fluid signals for providing one of said function signals in accordance with whichever of said first and second gated fluid signals has lower pressure.

4. The fluidic circuit according to claim 1 wherein said function generating means comprises:

fluidic amplifier means including: means for providing a power stream of fluid, at least three outlet passages for selectively receiving said power stream and providing respective fluid pressures in response to received portions of said power stream, and input means responsive to said input signal for selectively deflecting said power stream relative to said outlet passages;

maximum pressure selector means connected to at least one pair of said outlet passages for providing a first fluid pressure signal having a pressure substantially equal to the higher of the two pressures appearing at said at least one pair of outlet passages, said first fluid pressure signal corresponding to one of said function signals; and means for providing a second fluid pressure signal which varies inversely with said first fluid pressure signal, said second fluid pressure signal corresponding to another of said function signals.

5. The combination according to claim 4 further comprising summing means connected to receive all of the selectively provided function signals from said switching means for combining said signals to provide said output signal.

6. The fluidic circuit according to claim 1 wherein said function generating means comprises:

fluidic amplifier means including: means for providing a power stream of fluid, at least three outlet passages for selectively receiving said power stream and providing respective fluid pressures in response to received portions of said power stream, and input means responsive to said input signal for selectively deflecting said power stream relative to said outlet passages;

minimum pressure selector means for providing a first fluid pressure signal having a pressure substantially equal to the lower of the two pressures appearing at at least one pair of said outlet passages, said first fluid pressure signal corresponding to one of said function signals; and means for providing a second fluid pressure signal which varies inversely with said first fluid pressure signal, said second fluid pressure signal corresponding to another of said function signals.

7. The combination according to claim 6 further comprising summing means connected to receive all of the selectively provided function signals from said switching means for combining said signals to provide said output signals.

8. The circuit according to claim 1 wherein said function generating means includes:

fluidic amplifier means having at least three outlet passages for providing respective fluid signals as functions of a fluid input signal; and circuit means having common output means and connected to at least one pair of said outlet passages for providing at said common output means one of said function signals as a predetermined function of the amplitude difference between the signals appearing at each passage in said at least one pair of outlet passages.

9. The fluidic circuit according to claim 8 wherein said common output means comprises fluidic summing means responsive to application of said function signals thereto for providing said fluid output signal as a function of the sum of said function signals.

10. The fluidic circuit according to claim 8 wherein said common output means comprises fluidic means responsive to application of said function signals thereto for providing said fluid output signal as a function of the difference between said function signals.

11. The fluidic circuit according to claim 8 wherein said common output means comprises means responsive to application of said function signals thereto for providing said fluid output signal as a function of the sum of certain ones of said function signals and the difference between certain others of said function signals.

12. The fluidic circuit according to claim 8 wherein said circuit means comprises:

maximum amplitude selector means connected to said at least one pair of outlet passages for providing a fluid signal having an amplitude substantially equal to the higher of the two amplitudes of the signals appearing at said pair of outlet passages.

13. The fluidic circuit according to claim 12 wherein said circuit means further comprises means for providing as one of said function signals a signal of amplitude proportional to the amplitude difference between the fluid signal provided by said maximum amplitude selector means and the fluid signal at one of said outlet passages of said fluidic amplifier means.

14. The fluidic circuit according to claim 8 wherein said switching means comprises said plurality of fluidic transmission gates having said common output means, one gate for each of said function signals, each gate comprising: an input port connected to receive a respective function signal, at least one output channel disposed to selectively receive the function signal applied to said input port, means for connecting said output channel to said output means, and control means responsive to said predetermined commands for selectively inhibiting passage of respective function signals to said common output means.

15. The fluidic circuit according to claim 14 further comprising means for selectively initiating said predetermined commands.

16. The fluidic circuit according to claim 14 further comprising means responsive to the fluid output signal appearing at said common output means for selectively providing said predetermined commands.

17. The fluidic circuit according to claim 14 further comprising means responsive to said fluid input signal for selectively providing predetermined commands.

18. A fluidic circuit for providing a fluid output signal as a selectively variable function of the amplitude of a variable-amplitude fluid input signal, said selectively variable function varying in response to amplitude variations in a fluid command signal, said circuit comprising:

signal proportioning means, including an input port for receiving said input signal and a pair of output ports, for proportioning said variable-amplitude input signal between said output ports as a function of the amplitude of said command signal; and fluidic amplifier means responsive to different proportions of said variable-amplitude input signal at said output ports of said proportioning means for providing said fluid output signal as respective functions of said input signal 19. The circuit according to claim 18 wherein said command signal is an analog fluid signal which is selectively variable over a continuous range of signal levels and wherein said proportioning means is a proportional fluidic amplifier responsive to said command signal for proportioning the input signal between said output ports over a correspondingly continuous range of signal proportions.

20. The circuit according to claim 18 wherein said command signal is a digital fluid signal having a plurality of selective discrete signal levels, and wherein said proportioning means comprises a fluidic switching element for providing a corresponding plurality of discrete input signal proportions at said output port in response to said plurality of discrete command signal levels.

21. The circuit according to claim 18 wherein said amplifier means comprises:

power nozzle means responsive to application of pressurized fluid thereto for issuing a power stream of fluid;

at least one outlet passage disposed downstream of said power nozzle for receiving said power stream;

control means for selectively deflecting said power streams relative to said outlet passage, said control means comprising first and second control nozzles connected via said fluid passage means to respective ones of said output ports of said proportioning means, said control nozzles being located at different distances downstream of said power nozzle means and disposed to issue respective fluid control streams in interacting relationships with said power stream.

22. The circuit according to claim 18 wherein said amplifier means includes an analog type of fluidic amplifier having power nozzle means responsive to application of pressurized fluid thereto for issuing a power stream of fluid, a first pair of control nozzles disposed on opposite sides of the power stream and responsive to application of pressurized fluid thereto for issuing a respective pair of control streams in interacting relationship with said power stream, and receiving means for receiving varying portions of said power stream as a function of power stream deflection produced by said control streams, and wherein said fluid passage means includes means for connecting the output ports of said proportioning means to respective ones of said control nozzles of said to analog fluidic amplifier.

23. The circuit according to claim 18 wherein:

said fluid input signal is a differential fluid pressure signal;

said proportioning means comprises a further input port, a further pair of output ports, means responsive to said command signal for proportioning pressurized fluid applied to said further input port between said further pair of output ports, and means for applying said differential fluid pressure input signal across said input ports;

said amplifier means comprises first and second analog fluidic amplifiers each having power nozzle means responsive to application of pressurized fluid thereto for issuing a power stream of fluid, a first pair of control nozzles disposed on opposite sides of said power stream and responsive to application of pressurized fluid thereto for issuing respective control streams in interacting relationship with said power stream, and a pair of fluid output passages for receiving said power stream as a differential fluid pressure output signal in accordance with the deflection of said power stream by said control streams, said second fluidic amplifier additionally comprising a second pair of generally opposed control nozzles responsive to application of pressurized fluid thereto for issuing respective fluid control streams in interacting relationships with said power streams;

and further comprising fluid passage means, including a means for connecting one of said first-mentioned output ports of said proportioning means to one of said first pair of control nozzles of said first fluidic amplifier, means for connecting the other of said first-mentioned output ports of said proportioning means to one of said first pair of control nozzles of said second fluidic amplifier, means for connecting one of said further pair of output ports from said proportioning means to the other of said first pair of control nozzles of said first fluidic amplifier, means for connecting the other pair of said further pair of output ports of said proportioning means to the other of said first pair of control nozzles of said second fluidic amplifier, and means for connecting the output passages of said first amplifier to respective ones of said second pair of control nozzles of said second amplifier.

24. The circuit according to claim 18 wherein:

said amplifying means comprises first and second proportional fluidic amplifier means having different respective first and second determinable output signal versus input signal gain characteristics, and means for combining the output signals from said first and second proportional fluidic amplifier means;

said fluid passage means includes means for applying pressurized fluid from one output port of said proportioning means as an input signal to said first proportional fluidic amplifier means and means for applying pressurized fluid from the other output port of said proportioning means as an input signal to said second proportional fluidic amplifier means.

25. The circuit according to claim 18 wherein said amplifier means comprises:

power nozzle means responsive to application of pressurized fluid thereto for issuing a power stream of fluid;

at least one outlet passage disposed downstream of said power nozzle means for receiving said power stream;

control means for selectively deflecting said power stream relative to said outlet passages, said control means comprising at least first and second control nozzles connected to respective ones of said pair of output ports of said proportioning means, said control nozzles being disposed to issue respective fluid control streams in interacting relationship with said power stream such that control streams of equal momenta issuing from said control nozzles produce different degrees of deflection of said power stream.

26. The circuit according to claim 25 wherein said control nozzles are disposed at different angles relative to said power stream.

27. The circuit according to claim 25 wherein said amplifier means is a substantially planar device in which said power stream is restricted to deflection in a single plane.

28. The circuit according to claim 27 wherein said fluid input signal is a differential fluid pressure, wherein said proportioning means includes: another input port, a further pair of output ports, means responsive to said command signal for proportioning pressurized fluid applied to said another input port between said further pair of output ports, and means for applying said differential fluid pressure input signal across both said input ports; and wherein said amplifier means further comprises: third and fourth control nozzles connected to respective ones of said further pair of outlet ports, said third and fourth control nozzles being disposed such that both said first and third control nozzles and said second and fourth control nozzles are symmetrically arranged with respect to said power stream when deflected.

29. The circuit according to claim 18 wherein said amplifier means is a three-dimensional fluidic amplifier comprising:

power nozzle means responsive to application of pressurized fluid thereto for issuing a power stream of fluid along a predetermined axis;

control means for selectively deflecting said power stream for said predetermined axis in at least two different directional planes, said control means including first and second control nozzles each connected to a respective output port of said proportional means via said fluid passage means, each control nozzle being adapted to issue a respective control stream of fluid in response to application of pressurized fluid thereto for deflecting said power stream in a respective one of said two different planes;

deflecting means disposed downstream of said control means and responsive to deflection of said power stream by said control means for deflecting said power stream relative to said predetermined axis in a direction which is opposite to the direction of deflection produced by said control means and to a degree of deflection which varies with the direction of the deflection produced by said control means; and fluid receiving means disposed to receive said power stream downstream of said deflecting means for providing said fluid output signal as a function of the overall power stream deflection produced by said control means and deflecting means.

30. The circuit according to claim 29 wherein the degree of power stream deflection produced by said deflection means also varies with the degree of power stream deflection produced by said control means.

31. The circuit according to claim 30 wherein said deflecting means comprises a reversing chamber extending between said power nozzle means and said fluid receiving means, the interior wall of said reversing chamber diverging from said power nozzle means and then converging toward said receiving means, said interior wall being asymmetrical relative to said predetermined axis.

32. The circuit according to claim 31 wherein the cross-sectional configuration of said chamber perpendicular to said predetermined axis is of generally elliptical configuration.

33. The circuit according to claim 31 wherein said amplifier means further comprises two additional control nozzles, each disposed in substantial opposition to a respective one of said first and second control nozzles, wherein said fluid input signal is a differential fluid pressure signal, wherein said proportioning means includes another input port, a further pair of output ports, means responsive to said command signals for proportioning pressurized fluid applied to said another input port between a further pair of output ports, and means for applying said differential fluid pressure across the first-mentioned input port and said another input port, and wherein said two additional control nozzles are connected to said further pair of output ports via said fluid passage means.

34. A three-dimensional fluidic amplifier comprising:

power nozzle means responsive to application of pressurized fluid thereto for issuing a power stream of fluid along a predetermined axis;

control means for selectively deflecting said power stream in all planes parallel to and extending radially from said predetermined axis;

deflecting means disposed downstream of said control means and responsive to said deflection of power stream by said control means in all of said radially extending planes for deflecting said power stream relative to said axis in a direction which is radially opposite to the direction of the deflection initiated by said control means and with a degree of deflection which varies with the direction of the deflection initiated by said control means;

and fluid receiving means for selectively receiving said power stream as a function of the total power stream deflection produced by said control means and deflecting means.

35. The amplifier according to claim 34 wherein the degree of power stream deflection produced by said deflection means also varies with the degree of power stream deflection produced by said control means.

36. The amplifier according to claim 35 wherein said deflecting means comprises: a reversing chamber extending between said power nozzle means and said fluid receiving means, the interior wall of said reversing chamber diverging from said power nozzle means and then converging toward said receiving means, said interior wall being a continuous surface which is asymmetrical relative to said predetermined axis.

37. The amplifier according to claim 36 wherein the cross section of said chamber normal to said predetermined axis is of a generally elliptical configuration.

38. The amplifier according to claim 36 further comprising a gain adjustment means independent of said control means and said deflection means for selectively varying the direction in which said power stream is deflected in response to said control means.

39. The amplifier according to claim 38 wherein said gain adjustment means comprises means for selectively introducing a variable swirling motion in said power stream.

40. The amplifier according to claim 36 wherein said control means comprises at least two control nozzles, each responsive to application of pressurized fluid thereto for issuing a control stream in interacting relationship with said power stream, said control streams being directed in respective ones of said two different directional planes.

41. The amplifier according to claim 40 further comprising gain adjustment means independent of said control means and said deflection means for selectively varying the direction in which said power stream is deflected in response to said control means.

42. The amplifier according to claim 41 wherein said gain adjustment means comprises means for selectively introducing a variable swirling motion in said power stream.

43. The amplifier according to claim 42 wherein said last-mentioned means includes means for introducing a stream of fluid about the periphery of said power nozzle means.

44. A fluidic amplifier system responsive to a fluid input signal to provide a fluid output signal which is an amplified function of said fluid input signal, the gain of said amplifier system being selectively variable in response to a fluid command signal, said system comprising a plurality of fluidic amplifier means, each having a different gain;

means responsive to said fluid command signal for applying selective portions of said fluid input signal as individual input signals to said plurality of fluidic amplifier means, said selective portions being variable in response to the amplitude of said fluid command signal; and means for combining of output signals from said plurality of fluidic amplifier means for providing said fluid output signal for said system.

45. The system according to claim 44 wherein at least one of said fluidic amplifier means provides an output signal which is 180° out of phase with a fluid input signal applied thereto.

46. A fluidic amplifier having at least one inlet port and first and second outlet ports and responsive to application of a fluid signal to said inlet port for providing first and second fluid signals at respective ones of said first and second outlet ports;

signal selection means for providing as an output signal which ever of said first and second fluid signals has a predetermined characteristic relative to the other;

said signal selection means comprising means for providing as an output signal the one of said first and second fluid signals having the greater amplitude;

a third outlet port for said fluidic amplifier for providing a third fluid signal in response to said fluid input signal; and means for providing a further fluid signal having an amplitude which is proportional to the difference between the amplitudes of said output signal and said third fluid signal;

a third outlet port for said fluidic amplifier for providing a third fluid signal in response to said fluid input signal; and means for providing a further fluid signal having an amplitude which is proportional to the difference between the amplitudes of said output signal and said third fluid signal.

47. The combination according to claim 46 further comprising:

a variable gain fluidic amplifier having a signal inlet port adapted to receive a fluid input signal, a fluid output port for providing an amplifier output signal in response to said input signal and in accordance with the gain function of said variable gain amplifier, and gain control means for varying the gain function of said amplifier as a function of the amplitude of a gain command signal applied thereto; and means for applying said further fluid signal to said gain control means.

48. In combination:

a fluidic amplifier having at least one inlet port and first and second outlet ports and responsive to application of a fluid signal to said inlet port for providing first and second fluid signals at respective ones of said first and second outlet ports;

signal selection means for providing as an output signal whichever of said first and second fluid signals has a predetermined characteristic relative to the other, wherein said signal selection means comprises means for providing as an output signal the one of said first and second fluid signals having the greater amplitude;

the combination further comprising:

a variable gain fluidic amplifier having a signal inlet port adapted to receive a fluid input signal, a fluid output port for providing an amplifier output signal in response to said input signal and in accordance with the gain function of said variable gain fluidic amplifier, and gain control means varying the gain function of said variable gain amplifier as a function of the amplitude of a gain command signal applied thereto; and means for applying said output signal from signal selection means to said gain control means.

49. A fluidic amplifier having at least one inlet port and first and second outlet ports and responsive to application of a fluid signal to said inlet port for providing first and second fluid signals at respective ones of said first and second outlet ports;

signal selection means for providing as an output signal whichever of said first and second fluid signal has a predetermined characteristic relative to the other;

said signal selection means comprising means for providing as an output signal the one of said first and second fluid signals having the lesser amplitude;

a third outlet port for said fluidic amplifier for providing a third fluid signal in response to said fluid input signal; and means for providing a further fluid signal having an amplitude which is proportional to the difference between the amplitudes of said output signal and said third fluid signal.

50. The combination according to claim 49 further comprising:

a variable gain fluidic amplifier having a signal inlet port adapted to receive a fluid input signal, a fluid output port for providing an amplifier output signal in response to said input signal and in accordance with the gain function of said variable gain amplifier, and gain control means for varying the gain function of said amplifier as a function of the amplitude of a gain command signal applied thereto; and means for applying said further fluid signal to said gain control means.

51. In combination:

a fluidic amplifier having at least one inlet port and first and second outlet ports and responsive to application of a fluid signal to said inlet port for providing first and second fluid signals at respective ones of said first and second outlet ports;

signal selection means for providing as an output signal whichever of said first and second fluid signals has a predetermined characteristic relative to the other, wherein signal selection means comprises means for providing as an output signal the one of said first and second fluid signals having the lesser amplitude;

the combination further comprising:

a third outlet port for said fluidic amplifier for providing a third fluid signal in response to said fluid input signal; and means for providing a further fluid signal having an amplitude which is proportional to the difference between the amplitudes of said output signal and said third fluid signal;

the combination further comprising:

a variable gain fluidic amplifier having a signal inlet port adapted to receive a fluid input signal, a fluid output port for providing an amplifier output signal in response to said input signal and in accordance with the gain function of said variable gain fluidic amplifier, and gain control means for varying the gain function of said variable gain amplifier as a function of the amplitude of a gain command signal applied thereto; and means for applying said output signal from signal selection means to said gain control means.

52. In combination:

fluidic amplifier means having at least one inlet port and first and second outlet ports and responsive to application of an input signal to said inlet port for providing first and second fluid signals at said first and second outlet ports, respectively, said first and second fluid signals having amplitudes which vary with the amplitude of said input signal;

means for providing a third fluid signal having an amplitude which varies inversely with the amplitude of said first fluid signal;

means for providing a fourth fluid signal having an amplitude which varies inversely with said second fluid signal; and signal selecting means for selecting as an output signal whichever of said third and fourth fluid signals has a greater amplitude.

53. The combination according to claim 52 further comprising:

a variable gain fluidic amplifier having means responsive to the amplitude of an applied gain control signal for varying the gain of said variable gain amplifier; and means for applying said output signal from said signal selecting means as a gain control signal to said variable gain fluidic amplifier.

54. The combination according to claim 52 further comprising:

means for providing a further fluid signal having an amplitude which varies inversely with the amplitude of the output signal provided by said signal selecting means.

55. The combination according to claim 54 further comprising:

a variable gain fluidic amplifier having means responsive to the amplitude of said further fluid signal for varying the gain of said variable gain fluidic amplifier.

56. A fluidic system including means for providing at least two intermediate fluid signals which are functions of a fluid input signal, and means for selectively subtracting said intermediate signals, one from the other, in response to command signals to provide an output signal which is a new function of said fluid input signal.

57. The system according to claim 56 further comprising means for varying said command signals in response to system operation to change the characteristics of said new function.

58. A fluidic system including:

means for providing at least two intermediate signals which are each different respective functions of a fluid input signal;

gating means for selectively inhibiting passage of said intermediate signals; and means for combining those intermediate signals which are not inhibited to provide a new function of said fluid input signal.

59. The system according to claim 58 further comprising means responsive to predetermined operation of said system for operating said gating means to selectively inhibit said intermediate signals.